(12) United States Patent
Hendry et al.

(10) Patent No.: US 12,225,216 B2
(45) Date of Patent: *Feb. 11, 2025

(54) IMAGE OR VIDEO CODING BASED ON CHROMA QUANTIZATION PARAMETER OFFSET INFORMATION

(71) Applicant: LG ELECTRONICS INC., Seoul (KR)

(72) Inventors: Hendry Hendry, Seoul (KR); Seunghwan Kim, Seoul (KR); Jie Zhao, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,881

(22) Filed: May 13, 2024

(65) Prior Publication Data
US 2024/0298014 A1 Sep. 5, 2024

Related U.S. Application Data

(63) Continuation of application No. 17/774,438, filed as application No. PCT/KR2020/015415 on Nov. 5, 2020, now Pat. No. 12,028,536.

(60) Provisional application No. 62/931,177, filed on Nov. 5, 2019.

(51) Int. Cl.
*H04N 19/186* (2014.01)
*H04N 19/124* (2014.01)
*H04N 19/176* (2014.01)
*H04N 19/70* (2014.01)

(52) U.S. Cl.
CPC ......... *H04N 19/186* (2014.11); *H04N 19/124* (2014.11); *H04N 19/176* (2014.11); *H04N 19/70* (2014.11)

(58) Field of Classification Search
CPC .. H04N 19/186; H04N 19/124; H04N 19/176; H04N 19/70
USPC ..................................................... 375/240.03
See application file for complete search history.

(56) References Cited

U.S. PATENT DOCUMENTS

| | | | |
|---|---|---|---|
| 2015/0365671 A1 | 12/2015 | Pu et al. | |
| 2016/0373745 A1 | 12/2016 | Joshi et al. | |
| 2017/0374372 A1* | 12/2017 | Liu | H04N 19/186 |
| 2019/0124330 A1 | 4/2019 | Chien et al. | |
| 2019/0246114 A1 | 8/2019 | Tourapis et al. | |

FOREIGN PATENT DOCUMENTS

| | | |
|---|---|---|
| CN | 107113431 A | 8/2017 |
| CN | 109644273 A | 4/2019 |

* cited by examiner

*Primary Examiner* — Jeffery A Williams
(74) *Attorney, Agent, or Firm* — Bryan Cave Leighton Paisner LLP

(57) ABSTRACT

According to the disclosure of the present document, chroma quantization parameter offset-related information can be signaled through palette syntax coding, and index information for a chroma quantization parameter offset list can be efficiently parsed/signaled on the basis of information about the number of entries in the chroma quantization parameter offset list. Accordingly, bits that are required to be signaled in order to code a video/image can be reduced, and the coding efficiency can be enhanced.

3 Claims, 16 Drawing Sheets

IMAGE OR VIDEO CODING BASED ON CHROMA QUANTIZATION PARAMETER OFFSET INFORMATION

BACKGROUND OF DISCLOSURE

This application is a Continuation Application of U.S. patent application Ser. No. 17/774,438, filed on May 4, 2022, now allowed, which is a National Stage of International Application No. PCT/KR2020/015415, filed on Nov. 5, 2020, which claims the benefit of U.S. Provisional Application No. 62/931,177, filed on Nov. 5, 2019, the contents of which are all hereby incorporated by reference herein in their entirety.

FIELD OF THE DISCLOSURE

The present technology relates to video or image coding, such as, a chroma quantization parameter offset information based coding technique.

RELATED ART

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

In addition, there is a need for a method for effectively signaling image/video information and improving coding efficiency, and for this purpose, a method for effectively signaling information related to a chroma quantization parameter is required.

SUMMARY

This document is to provide a method and apparatus for improving video/image coding efficiency.

This document is also to provide a method and apparatus for efficiently parsing/signaling palette coding and/or transform unit-related information.

This document is also to provide a method and apparatus for defining a condition for effectively parsing/signaling palette coding and/or transformation unit-related information, and for parsing/signaling corresponding information based on the condition.

The present document is also to provide a method and apparatus for effectively parsing/signaling chroma quantization parameter offset related information in a palette coding and/or transform unit.

According to an embodiment of the present document, the palette coding syntax may include chroma quantization parameter offset related information, and the chroma quantization parameter offset related information may be parsed/signaled based on information about the number of entries in the chroma quantization parameter offset list. For example, the chroma quantization parameter offset related information may be index information for the chroma quantization parameter offset list.

According to an embodiment of the present document, based on the value of information on the number of entries in the chroma quantization parameter offset list being greater than 0, the index information on the chroma quantization parameter offset list may be included in the palette coding syntax.

According to an embodiment of the present document, a video/image decoding method performed by a decoding apparatus is provided. The video/image decoding method may include the method disclosed in the embodiments of this document.

According to an embodiment of the present document, a decoding apparatus for performing video/image decoding is provided. The decoding apparatus may include the method disclosed in the embodiments of this document.

According to an embodiment of the present document, a video/image encoding method performed by an encoding apparatus is provided. The video/image encoding method may include the method disclosed in the embodiments of this document.

According to an embodiment of the present document, an encoding apparatus for performing video/image encoding is provided. The encoding apparatus may include the method disclosed in the embodiments of this document.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

The present document may have various effects. For example, according to an embodiment of the present document, it is possible to improve overall image/video compression efficiency. In addition, according to an embodiment of the present document, it is possible to efficiently parse/signal the palette coding and/or transform unit-related information. Additionally, according to an embodiment of the present document, by defining a condition for effectively parsing/signaling palette coding and/or transform unit-related information, it is possible to effectively code the corresponding information without redundancy according to the condition. In addition, according to an embodiment of the present document, by determining whether to parse the index information for the chroma quantization parameter offset list based on the condition for the number of entries in the chroma quantization parameter offset list in the palette coding and/or transform unit, coding efficiency can be improved, and the effect of saving transmitted bits can be obtained.

Effects that can be obtained through a detailed example of the present document are not limited to the effects enumerated above. For example, there may be various technical effects that can be understood or induced by a person having ordinary skill in the related art from the present document. Accordingly, the detailed effects of the present document are not limited to those explicitly stated in the present document, but may include various effects that can be understood or induced from the technical features of the present document.

DESCRIPTION OF EMBODIMENTS

Figure 1:
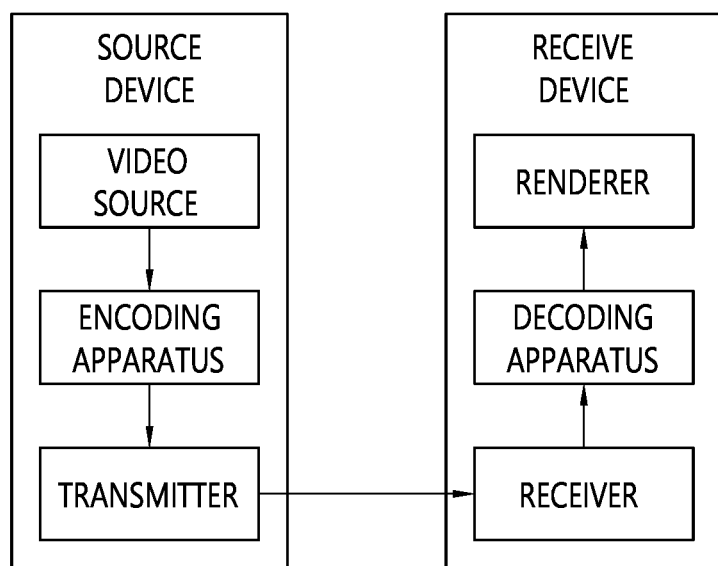
FIG. 1 briefly illustrates an example of a video/image coding device to which embodiments of the present document are applicable.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, "A or B" may mean "only A", "only B" or "both A and B". In other words, "A or B" in this document may be interpreted as "A and/or B". For example, in this document "A, B or C" means "only A", "only B", "only C", or "any combination of A, B and C".

A slash (/) or comma (,) used in this document may mean "and/or". For example, "A/B" may mean "A and/or B". Accordingly, "A/B" may mean "only A", "only B", or "both A and B". For example, "A, B, C" may mean "A, B, or C".

In this document, "at least one of A and B" may mean "only A", "only B" or "both A and B". Also, in this document, the expression "at least one of A or B" or "at least one of A and/or B" means "at least one It can be interpreted the same as "at least one of A and B".

Also, in this document, "at least one of A, B and C" means "only A", "only B", "only C", or "A, B and C" Any combination of A, B and C". Also, "at least one of A, B or C" or "at least one of A, B and/or C" means may mean "at least one of A, B and C".

Also, parentheses used in this document may mean "for example". Specifically, when "prediction (intra prediction)" is indicated, "intra prediction" may be proposed as an example of "prediction". In other words, "prediction" in this document is not limited to "intra prediction", and "intra prediction" may be proposed as an example of "prediction". Also, even when "prediction (ie, intra prediction)" is indicated, "intra prediction" may be proposed as an example of "prediction".

The present document relates to video/image coding. For example, a method/embodiment disclosed in the present document may be applied to a method disclosed in the versatile video coding (VVC) standard. In addition, a method/embodiment disclosed in the present document may be applied to a method disclosed in the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice includes an integer number of complete tiles or an integer number of consecutive complete CTU rows within a tile of a picture that may be exclusively contained in a single NAL unit Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Additionally, in this document, at least one of quantization/dequantization and/or transform/inverse transform may be skipped. When the quantization/dequantization is skipped, the quantized transform coefficient may be referred to as a transform coefficient. When the transform/inverse transform is skipped, the transform coefficient may be referred to as a coefficient or a residual coefficient, or may still be referred to as the transform coefficient for consistency of expression.

In this document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of this document as well.

Technical features that are individually described in one drawing in this document may be implemented individually or may be implemented at the same time.

Hereinafter, with reference to the accompanying drawings, preferred embodiments of the present document will be described in more detail. Hereinafter, the same reference signs are used for the same components in the drawings, and repeated descriptions for the same components may be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded video/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
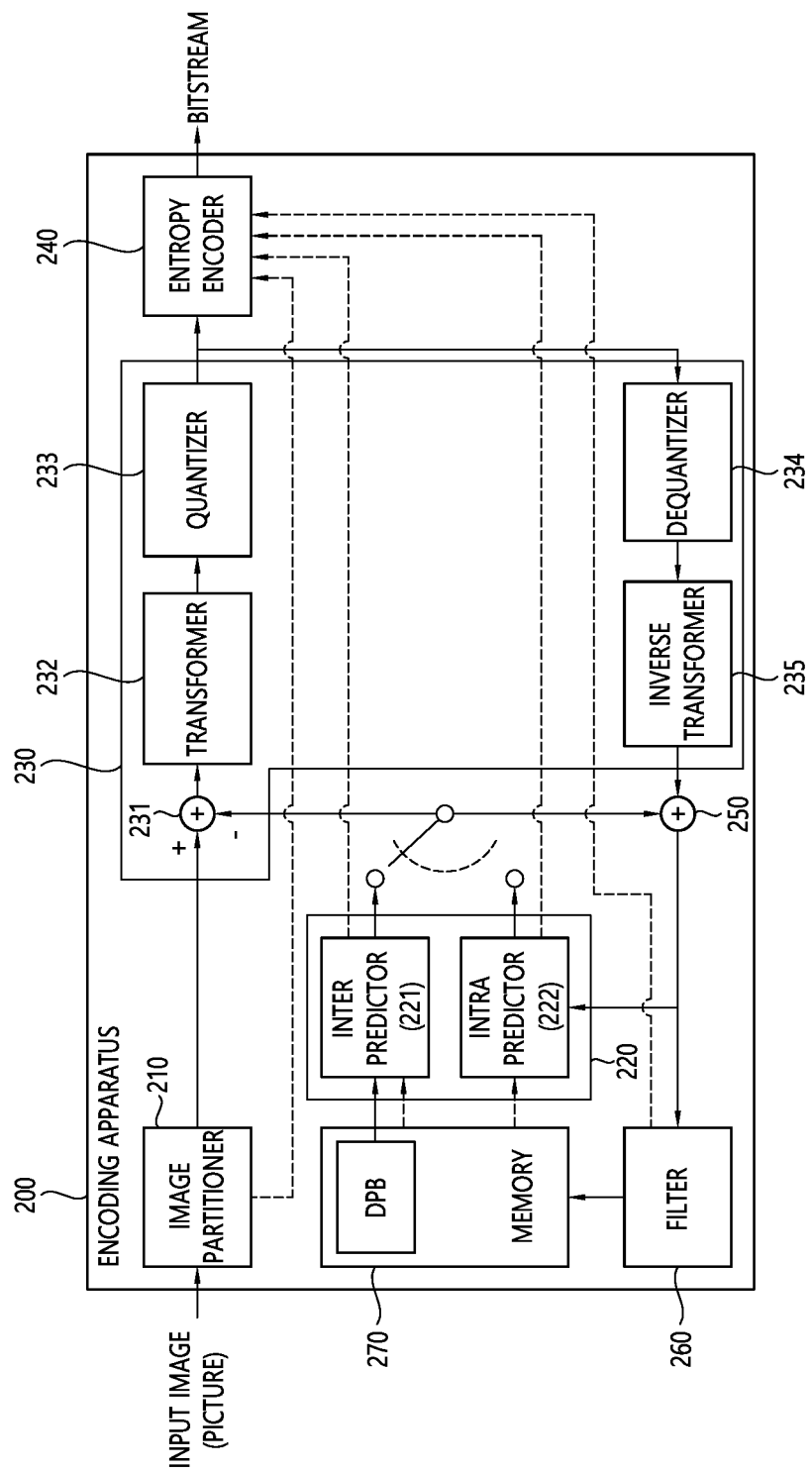
FIG. 2 is a schematic diagram illustrating a configuration of a video/image encoding apparatus to which the embodiment(s) of the present document may be applied.

FIG. 2 is a diagram schematically illustrating a configuration of a video/image encoding apparatus to which the embodiments of the present document may be applied. Hereinafter, what is referred to as the encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The prediction signal generated through the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, the GBT means transform obtained from a graph when relationship information between pixels is represented by the graph. The CNT means transform obtained based on a prediction signal generated using all previously reconstructed pixels. In addition, the transform process may be applied to square pixel blocks of the same size, or may be applied to non-square blocks of varying sizes.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
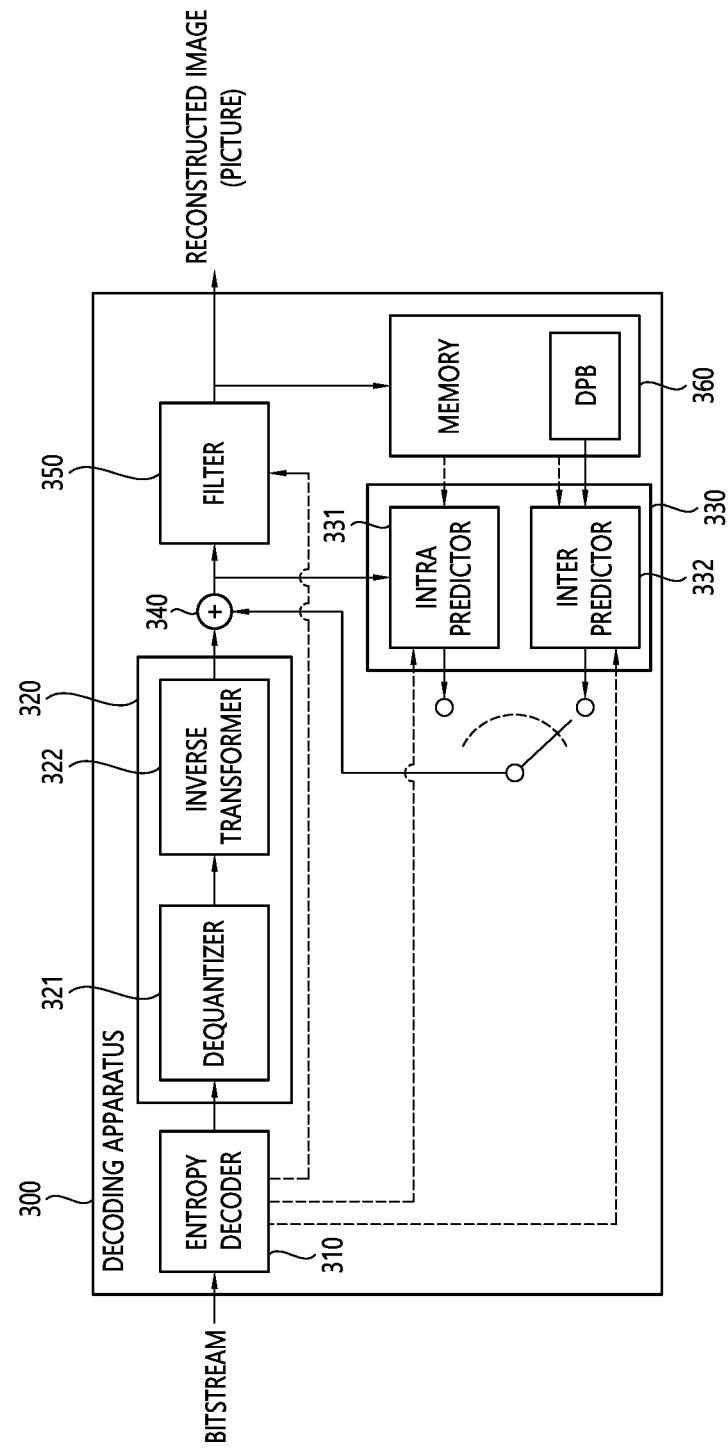
FIG. 3 is a schematic diagram illustrating a configuration of a video/image decoding apparatus to which the embodiment(s) of the present document may be applied.

FIG. 3 is a diagram for schematically explaining a configuration of a video/image decoding apparatus to which the embodiments of the present document may be applied. Hereinafter, what is referred to as the decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present document, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

As described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
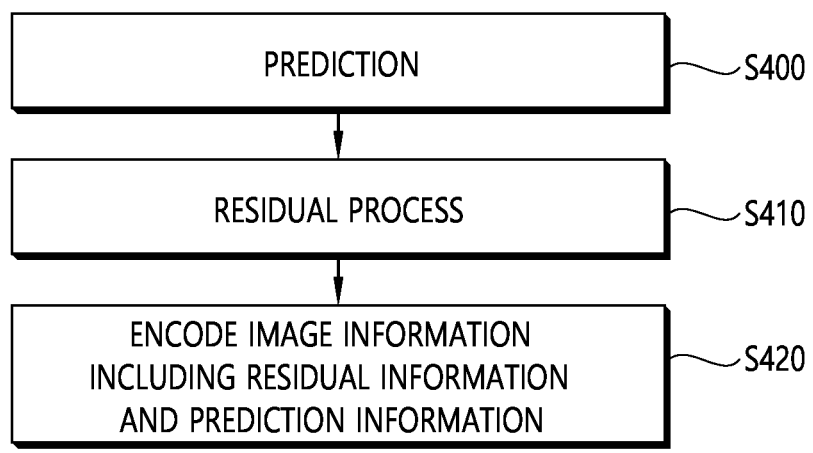
FIG. 4 represents an example of a schematic video/image encoding process to which an embodiment(s) of this document is applicable.

FIG. 4 represents an example of a schematic video/image encoding process to which an embodiment(s) of this document is applicable. In FIG. 4, S400 may be performed in the predictor 220 of the encoding apparatus described above in FIG. 2; S410 may be performed in the residual processor 230; and S420 may be performed in the entropy encoder 240. S400 may include the inter/intra prediction process described in the present document; S410 may include the residual processing process described in the present document; and S420 may include the information encoding process described in the present document.

Referring to FIG. 4, the video/image encoding process may schematically include, as represented in the description with regard to FIG. 2, a process of generating a reconstructed picture for a current picture and a process (optional) of applying in-loop filtering to the reconstructed picture, as well as a process of encoding information for picture reconstruction (e.g., prediction information, residual information, partitioning information or the like) and outputting it in the form of a bitstream. The encoding apparatus may derive (modified) residual samples from a quantized transform coefficient through the dequantizer 234 and the inverse transformer 235, and may generate a reconstructed picture based on the (modified) residual samples and the prediction samples, which are the outputs of S400. The reconstructed picture generated in this way may be the same as the above-described reconstructed picture generated in the decoding apparatus. Through the in-loop filtering process for the reconstructed picture, the modified reconstructed picture may be generated, which may be stored in the decoding picture buffer or a memory 270, and used as a reference picture in the inter prediction process of the later picture encoding, similarly to the case of the decoding apparatus. As described above, all or a part of the in-loop filtering process may be skipped according to circumstances. In a case where the in-loop filtering process is performed, (in-loop) filtering-related information (parameter) may be encoded in the entropy encoder 240 and output in the form of a bitstream, and the decoding apparatus may perform the in-loop filtering process in the same way as that of the encoding apparatus based on the filtering-related information.

Through this in-loop filtering process, it is possible to reduce noises, such as blocking artifact and ringing artifact, which are generated during the image/video coding, and to increase subjective/objective visual quality. Further, as the in-loop filtering process is performed in both the encoding apparatus and the decoding apparatus, the encoding apparatus and the decoding apparatus can derive the same prediction result, increase the reliability of the picture coding, and reduce the amount of data to be transmitted for picture coding.

As described above, the picture reconstruction process may be performed in the encoding apparatus as well as in the decoding apparatus. Based on intra prediction/inter prediction on each block unit, a reconstructed block may be generated, and a reconstructed picture including the reconstructed blocks may be generated. In a case where a current picture/slice/tile group is an I picture/slice/tile group, the blocks included in the current picture/slice/tile group may be reconstructed only based on the intra prediction. Meanwhile, in a case where a current picture/slice/tile group is a P or B picture/slice/tile group, the blocks included in the current picture/slice/tile group may be reconstructed based on the intra prediction or inter prediction. In this case, the inter prediction may be applied to some of the blocks in the current picture/slice/tile group, and the intra prediction may be applied to some of the rest of the blocks. A colour component of the picture may include a luma component and a chroma component, and the methods and embodiments proposed in this document may be applied to the luma component and the chroma component unless explicitly limited by this document.

Figure 5:
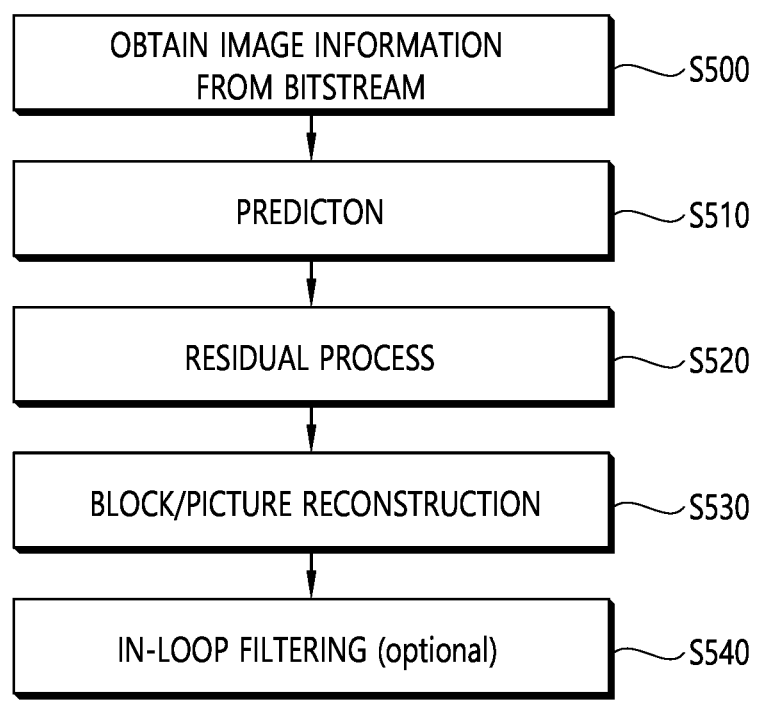
FIG. 5 represents an example of a schematic video/image decoding process to which an embodiment(s) of this document is applicable.

FIG. 5 represents an example of a schematic video/image decoding process to which an embodiment(s) of this document is applicable. In FIG. 5, S500 may be performed in the entropy decoder 310 of the decoding apparatus described above in FIG. 3; S510 may be performed in the predictor 330; S520 may be performed in the residual processor 320; S530 may be performed in the adder 340; and S540 may be performed in the filter 350. S500 may include the information decoding process described in the present document; S510 may include the inter/intra prediction process described in the present document; S520 may include the residual processing process described in the present document; S530 may include the block/picture reconstruction process described in the present document; and S540 may include the in-loop filtering process described in the present document.

Referring to FIG. 5, as represented in the description with regard to FIG. 3, the picture decoding process may schematically include an image/video information obtaining process S500 from a bitstream (through decoding), a picture reconstruction process S510 to S530, and an in-loop filtering process S540 for the reconstructed picture. The picture reconstruction process may be performed based on the residual samples and the prediction samples obtained through the inter/intra prediction S510 and the residual process S520 (dequantization, inverse transform for the quantized transform coefficient). Through the in-loop filtering process for the reconstructed picture which has been generated though the picture reconstruction process, a modified reconstructed picture may be generated, which may be output as a decoded picture, and may also be stored in the decoding picture buffer or a memory 360 of the decoding apparatus and used as a reference picture in the inter prediction process of the later picture decoding.

According to circumstances, the in-loop filtering process may be skipped, and in this case, the reconstructed picture may be output as a decoded picture, and may also be stored in the decoding picture buffer or a memory 360 of the decoding apparatus and used as a reference picture in the inter prediction process of the later picture decoding. The in-loop filtering process S540 may include the deblocking filtering process, the sample adaptive offset (SAO) process, the adaptive loop filter (ALF) process, and/or the bi-lateral filter process as described above, and all or some of them may be skipped. Further, one or some of the deblocking filtering process, the sample adaptive offset (SAO) process, the adaptive loop filter (ALF) process, and the bi-lateral filter processes may be sequentially applied, or all of them may be sequentially applied. For example, after the deblocking filtering process is applied to the reconstructed picture, the SAO process may be performed thereon. Alternatively, for example, after the deblocking filtering process is applied to the reconstructed picture, the ALF process may be performed thereon. This may be likewise performed in the encoding apparatus.

Meanwhile, as described above, the encoding apparatus performs entropy encoding based on various encoding methods such as, for example, exponential Golomb, context-adaptive variable length coding (CAVLC), context-adaptive binary arithmetic coding (CABAC) and the like. Also, the decoding apparatus may perform entropy decoding based on a coding method such as exponential Golomb coding, CAVLC, or CABAC. Hereinafter, an entropy encoding/decoding process will be described.

Figure 6:
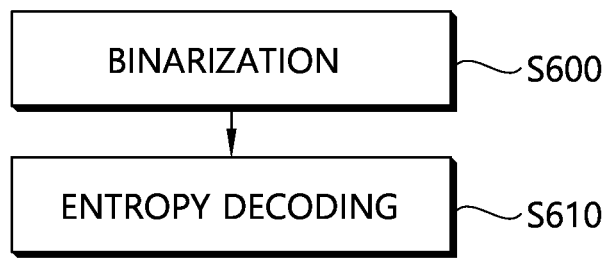
FIG. 6 schematically illustrates an example of an entropy encoding method to which embodiments of this document are applicable, and FIG. 7 schematically illustrates an entropy encoder in an encoding apparatus.
Figure 7:
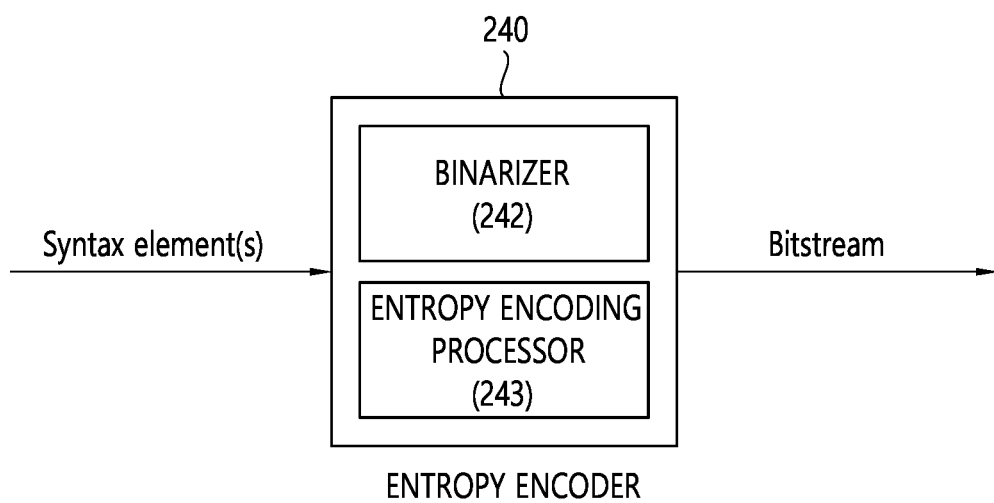

FIG. 6 schematically illustrates an example of an entropy encoding method to which embodiments of this document are applicable, and FIG. 7 schematically illustrates an entropy encoder in an encoding apparatus. The entropy encoder in the encoding apparatus of FIG. 7 may also be equally or correspondingly applied to the entropy encoder 240 of the encoding apparatus 200 of FIG. 2 described above.

Referring to FIGS. 6 and 7, the encoding apparatus (entropy encoder) performs an entropy coding process on image/video information. The image/video information may include partitioning-related information, prediction-related information (e.g., inter/intra prediction distinguishing information, intra prediction mode information, inter prediction mode information, or the like), residual information, in-loop filtering-related information, or may include various syntax elements related to them. The entropy coding may be performed in syntax element units. S600 and S610 may be performed by the above-described entropy encoder 240 of the encoding apparatus 200 of FIG. 2.

The encoding apparatus may perform binarization on a target syntax element (S600). Here, the binarization may be based on various binarization methods such as Truncated Rice binarization process, Fixed-length binarization process, and the like, and the binarization method for the target syntax element may be predefined. The binarization process may be performed by a binarizer 242 in the entropy encoder 240.

The encoding apparatus may perform entropy encoding on the target syntax element (S610). The encoding apparatus may regular coding-based (context-based) or bypass coding-based encode a bin string of the target syntax element based on a entropy coding scheme such as context-adaptive arithmetic coding (CABAC) or context-adaptive variable length coding (CAVLC), and the output thereof may be incorporated into the bitstream. The entropy encoding process may be performed by an entropy encoding processor 243 in the entropy encoder 240. As described above, the bitstream may be transferred to the decoding apparatus through a (digital) storage medium or a network.

Figure 8:
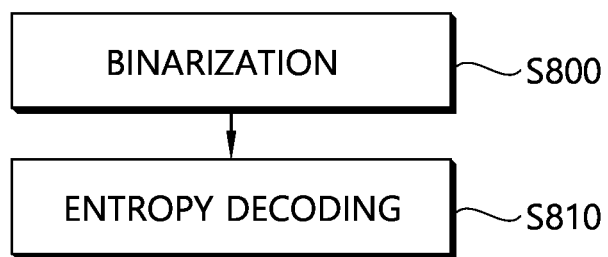
FIG. 8 schematically illustrates an example of an entropy decoding method to which embodiments of this document are applicable, and FIG. 9 schematically illustrates an entropy decoder in an encoding apparatus.
Figure 9:
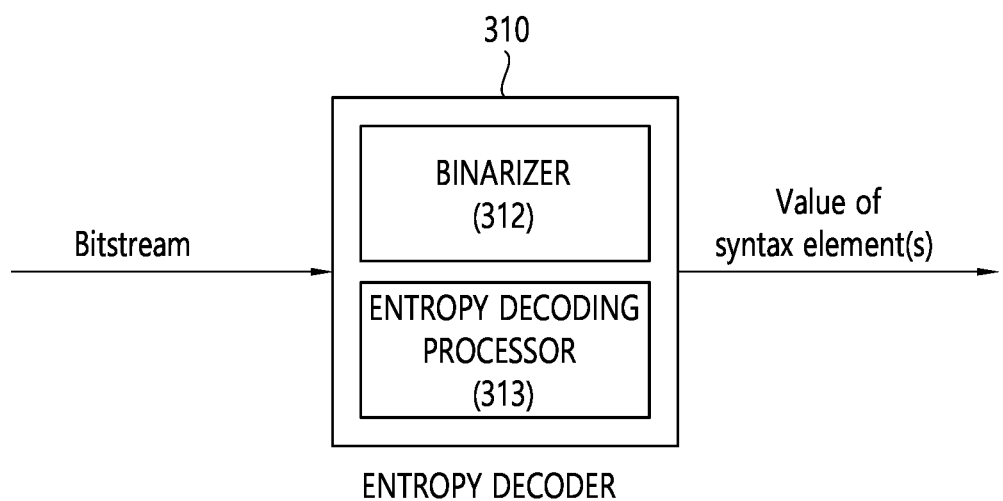

FIG. 8 schematically illustrates an example of an entropy decoding method to which embodiments of this document are applicable, and FIG. 9 schematically illustrates an entropy decoder in an encoding apparatus. The entropy decoder in the decoding apparatus of FIG. 9 may also be equally or correspondingly to the entropy decoder 310 of the decoding apparatus 300 of FIG. 3 described above.

Referring to FIGS. 8 and 9, a decoding apparatus (entropy decoder) may decode encoded image/video information. The image/video information may include partitioning-related information, prediction-related information (e.g., inter/intra prediction distinguishing information, intra prediction mode information, inter prediction mode information, or the like), residual information, in-loop filtering-related information, or may include various syntax elements related to them. The entropy coding may be performed in syntax element units. S800 and S810 may be performed by the above-described entropy decoder 310 of the decoding apparatus 300 of FIG. 3.

The decoding apparatus may perform binarization on a target syntax element (S800). Here, the binarization may be based on various binarization methods such as Truncated Rice binarization process, Fixed-length binarization process, and the like, and the binarization method for the target syntax element may be predefined. The decoding apparatus may derive enabled bin strings (bin string candidates) for enabled values of the target syntax element through the binarization process. The binarization process may be performed by a binarizer 312 in the entropy decoder 310.

The decoding apparatus may perform entropy decoding on the target syntax element (S810). While decoding and parsing sequentially each bin for the target syntax element from the input bit(s) in the bitstream, the decoding apparatus compares the derived bin string with enabled bin strings for the corresponding syntax element. When the derived bin string is the same as one of the enabled bin strings, the value corresponding to the bin string may be derived as a value of the syntax element. If not, the above-described process may be performed again after further parsing the next bit in the bitstream. Through these processes, even without using a start bit or an end bit for specific information (specific syntax element) in a bitstream, the decoding apparatus may signal the information using a variable length bit. Through this, relatively less bits may be assigned to a low value, thereby increasing an overall coding efficiency.

The decoding apparatus may perform context-based or bypass-based decoding on respective bins in the bin string from a bitstream based on an entropy coding technique such as CABAC, CAVLC or the like. In this connection, the bitstream may include various information for image/video decoding as described above. As described above, the bitstream may be transferred to the decoding apparatus through a (digital) storage medium or a network.

Figure 10:
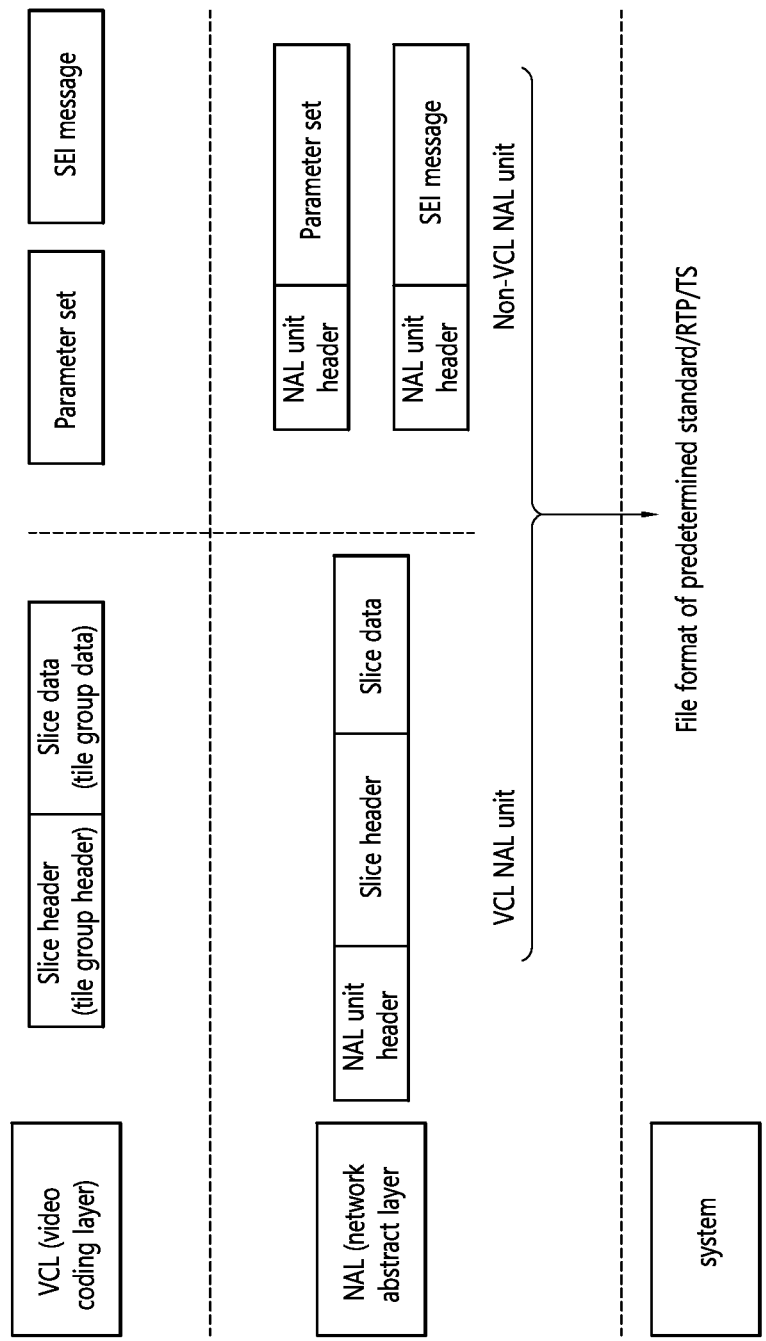
FIG. 10 exemplarily represents a hierarchical structure for a coded image/video.

FIG. 10 exemplarily shows a hierarchical structure for a coded image/video.

Referring to FIG. 10, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

Additionally, the NAL unit may be divided into a VCL NAL unit and a Non-VCL NAL unit according to the RBSP generated in the VCL. The VCL NAL unit may refer to a NAL unit including information on an image (slice data), and the Non-VCL NAL unit may refer to a NAL unit including information (parameter set or SEI message) required to decode an image.

The VCL NAL unit and Non-VCL NAL unit may be transmitted through a network by attaching header information according to a data standard of the subsystem. For example, the NAL unit may be transformed into a data form of a predetermined standard, such as an H.266/VVC file format, a Real-time Transport Protocol (RTP), and a Transport Stream (TS), etc., and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In this document, a tile group may be mixed or replaced with a slice or a picture. Also, in this document, a tile group header may be mixed or replaced with a slice header or a picture header.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

Meanwhile, as described above, the encoding apparatus may derive a residual block (residual samples) based on a block (prediction samples) predicted through intra/inter/IBC/palette prediction, etc., and may derive quantized transform coefficients by applying transform and quantization to the derived residual samples. Information on the quantized transform coefficients (residual information) may be included in the residual coding syntax, and be output in the form of a bitstream after encoding. The decoding apparatus may derive the quantized transform coefficients by obtaining and decoding information (residual information) on the quantized transform coefficients from the bitstream. The decoding apparatus may derive residual samples through dequantization/inverse transformation based on the quantized transform coefficients. As described above, at least one of quantization/dequantization and/or transform/inverse transform may be skipped. When the transform/inverse transform is skipped, the transform coefficient may be referred to as a coefficient or a residual coefficient, or may still be referred to as the transform coefficient for consistency of expression. Whether the transform/inverse transform is skipped may be signaled based on transform_skip_flag. For example, when the value of transform_skip_flag is 1, it may indicate that the transform/inverse transform is skipped, and this may be referred to as a transform skip mode.

In general, in video/image coding, a quantization rate may be changed, and compression rate may be adjusted using the changed quantization rate. In terms of implementation, a quantization parameter QP may be used instead of using the quantization rate directly in consideration of complexity. For example, quantization parameters of integer values from 0 to 63 may be used, and each quantization parameter value may correspond to an actual quantization rate. Further, for example, a quantization parameter QPY for a luma component (luma sample) and a quantization parameter QPC for a chroma component (chroma sample) may be set differently.

The quantization process takes a transform coefficient C as an input, divides it by a quantization rate Qstep, and based on this, a quantized transform coefficient C' may be obtained. In this case, under the consideration of computational complexity, a quantization rate may be multiplied by a scale to form an integer, and a shift operation may be performed by a value corresponding to the scale value. A quantization scale may be derived based on the product of the quantization rate and the scale value. That is, the quantization scale may be derived depending on the QP. For example, by applying the quantization scale to the transform coefficient C, a quantized transform coefficient C' may be derived based thereon.

The dequantization process is the inverse process of the quantization process, and may obtain a reconstructed transform coefficient C" based on what is obtained by multiplying the quantized transform coefficient C' by the quantization rate Qstep. In this case, a level scale may be derived depending on the quantization parameter, and a reconstructed transform coefficient C" may be derived based on what is obtained by applying the level scale to the quantized transform coefficient C'. The reconstructed transform coefficient C" may be slightly different from the original transform coefficient C due to loss in the transform and/or quantization process. Therefore, the encoding apparatus performs dequantization in the same manner as in the decoding apparatus.

Meanwhile, performing prediction may be based on palette coding. The palette coding is a useful technique in representing blocks that contain a small number of unique color values. Instead of applying prediction and transform to a block, the palette mode signals an index to indicate the value of each sample. This palette mode is useful in saving video memory buffer space. A block may be coded using a palette mode (e.g., MODE_PLT). In order to decode this encoded block, the decoder must decode the palette entry and index. A palette entry may be represented by a palette table, and may be encoded by a palette table coding tool.

The palette coding may be referred to as (intra) palette mode or (intra) palette coding mode or the like. The current block may be reconstructed according to the palette coding or the palette mode. Palette coding may be regarded as an example of intra coding, or may be regarded as one of intra prediction methods. However, similar to the skip mode described above, a separate residual value for the corresponding block may not be signaled.

For example, the palette mode may be used to improve coding efficiency for screen content such as computer generated video that contains significant amounts of text and graphics. In a general natural image acquired by a camera, there is a difference in values even between pixels representing the same object due to shading, motion, camera noise, and the like. However, computer-generated images and videos such as animations and texts may express a specific region with only a limited number of pixels or a small difference in pixel values existing within the same region. In order to utilize this characteristic, a set of pixels that can construct a specific region may be constructed as a palette or palette table, and the value of pixel expressing the region may be designated as each palette entry to represent the samples of the block.

For example, when the palette mode is selected, information on the palette table may be signaled. The palette table may include an index corresponding to each pixel. The palette table may construct a palette prediction table from pixel values used in the previous block. For example, previously used pixel values are stored in a specific buffer (palette predictor), and palette predictor information (palette_predictor_run) for constructing the current palette may be received from this buffer. That is, the palette predictor may include data indicating an index for at least a portion of a palette index map of the current block. When the palette entry for representing the current block is not sufficient with the palette prediction entry constructed from the palette predictor, pixel information for the current palette entry may be transmitted separately.

The palette mode is signaled at the CU level, and can generally be used when most pixels in a CU can be represented by a set of representative pixel values. That is, in the palette mode, samples in a CU may be represented as a set of representative pixel values. Such set may be referred to as a palette. In the case of a sample having a value close to the pixel value in the palette, a palette index (palette_idx_idc) corresponding to a pixel value in the palette or information (run_copy_flag, copy_above_palette_indices_flag) that may indicate an index may be signaled. In the case of a sample having a pixel value other than the palette entry, the sample may be marked with an escape symbol and the quantized sample value may be signaled directly. In this document, a pixel or pixel value may be referred to as a sample or sample value.

In order to decode a block coded in the palette mode, the decoder needs palette entry information and palette index information. When the palette index corresponds to an escape symbol, a (quantized) escape value may be signaled as an additional component. In addition, the encoder should derive an appropriate palette for the CU and deliver it to the decoder.

For efficient coding of palette entry, a palette predictor may be maintained. The palette predictor and the maximum size of the palette may be signaled in the SPS. Alternatively, the palette predictor and the palette maximum size may be predefined. For example, the palette predictor and the maximum palette size may be defined as 31 and 15, respectively, depending on whether the current block is a single tree or a dual tree. In the VVC standard, sps_palette_enabled_flag indicating whether the palette mode is enabled may be transmitted. Then, a pred_mode_plt_coding flag indicating whether the current coding unit is coded in the palette mode may be transmitted. The palette predictor may be initialized at the beginning portion of each brick or each slice.

For each entry in the palette predictor, a reuse flag may be signaled to indicate whether it is a portion of the current palette. The reuse flag may be transmitted using a run-length coding of zero. Then, the number of new palette entries may be signaled using 0th order exponential Golomb coding. Finally, a component value for a new palette entry may be signaled. After encoding the current CU, the palette predictor may be updated using the current palette, and entries of the previous palette predictor that are not reused in the current palette may be added to the end of the new palette predictor until reaching the allowed maximum size(palette stuffing).

The index may be coded using horizontal and vertical traverse scans to code the palette index map. The scan order may be explicitly signaled from the bitstream using flag information (e.g., palette_transpose_flag). Hereinafter, in this document, for convenience of description, horizontal scanning will be mainly described. Also, this can be applied to vertical scans as well.

Meanwhile, the palette index may be coded using two palette sample modes, and, for example, an "INDEX" mode and a "COPY_ABOVE" mode may be used. This palette mode may be signaled using a flag indicating whether the mode is "INDEX" or "COPY_ABOVE". In this case, the escape symbol may be signaled in the "INDEX" mode, and the same index as the current palette size may be allocated. For example, when the size of the current palette is 10, indexes 0 to 9 may refer to entry indexes in the palette, and index 10 may refer to an index for an escape symbol. When the horizontal scan is used, flag can be signaled except for the top row, and when the vertical scan is used or when previous mode is the "COPY_ABOVE" mode, flag can be signaled except for the first column. In the "COPY_ABOVE" mode, the palette index of the sample in the row above may be copied. In the "INDEX" mode, the palette index may be explicitly signaled. For both "INDEX" mode and "COPY_ABOVE" mode, a run value indicating the number of next samples to be coded using the same mode may be signaled. If the escape symbol is a part of a run in the "INDEX" mode or "COPY_ABOVE" mode, escape component values may be signaled for each escape symbol.

The coding for the palette index is as follows. First, the number of indexes for a CU may be signaled. The actual indices for the entire CU may then be signaled using fixed length coding. The number of indices, and the index may be coded in a bypass mode. This allows index related bypass bins to be grouped together. Next, the palette sample mode (copy_above_palette_indices_flag) and the run may be signaled in an interleaved manner. Finally, component escape values corresponding to escape samples for the entire CU may be grouped together and coded in the bypass mode.

Meanwhile, in the VVC standard, a dual tree may be enabled for I slice that separates coding unit partitioning for luma and chroma. The palette coding (palette mode) may be applied to luma (Y component) and chroma (Cb and Cr component) individually or together. When the dual tree is disabled, the palette coding (palette mode) may be applied to luma (Y component) and chroma (Cb and Cr component) together.

Figure 11:
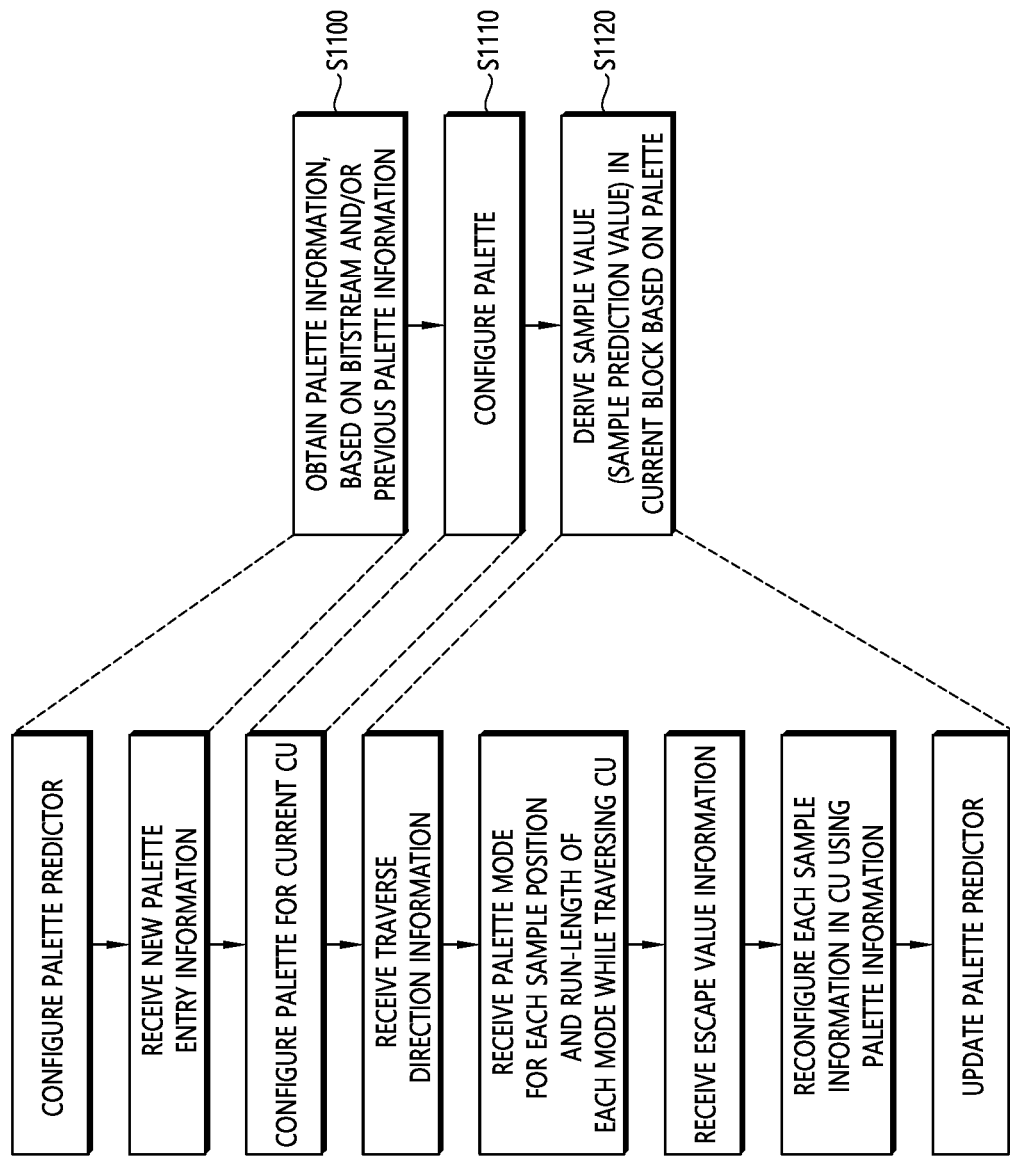
FIG. 11 is a diagram for explaining an example of a palette mode-based coding method.

FIG. 11 is a diagram for explaining an example of a palette mode-based coding method.

Referring to FIG. 11, the decoding apparatus may obtain palette information based on a bitstream and/or previous palette information (S1100).

As an embodiment, the decoding apparatus may construct a palette predictor. The palette information used in the previous block may be stored for the next palette CU (i.e., CU coded in palette mode) to be generated later, and it may be defined as a palette predictor entry.

The decoding apparatus may construct a palette based on the palette information (S1110).

For example, the decoding apparatus may receive new palette entry information, and construct a palette for the current CU. For example, after receiving the received palette predictor reuse information and new palette entry information to be used in the current CU, the decoding apparatus may combine these two entry information, and construct one palette representing the current CU.

The decoding apparatus may derive a sample value (a sample prediction value) in the palette-based current block (S1120).

In one embodiment, the decoding apparatus may traverse the palette index information, traverse direction (scan order) information, samples in the CU from the bitstream, and may receive palette mode information for each sample position and continuous length (run-length) information of each palette mode information. And, the decoding apparatus may construct samples from the obtained palette information while traversing the samples in the CU in a horizontal direction or a vertical direction based on the traverse direction (scan order) information. If the palette mode information indicates the COPY_ABOVE mode, each sample value in the CU can be derived by copying the index information of the left sample position in the vertical scan, and by copying the index information of the uppermost sample position in the horizontal scan. That is, by deriving the value of each sample from the constructed palette table based on the index information of each sample in the CU, prediction samples in the CU can be derived. And, the decoding apparatus may reconstruct each sample information in the CU using the palette information and update the palette predictor.

Meanwhile, in this document, a table (syntax table) including syntax elements may be used to indicate signaling of information from the encoding apparatus to the decoding apparatus. An order of syntax elements of a syntax table used in this document may indicate a parsing order of syntax elements from a bitstream. The encoding apparatus may construct and encode the syntax table so that the syntax elements can be parsed by the decoding apparatus in a parsing order, while the decoding apparatus may obtain values of the syntax elements by parsing and decoding the syntax elements of the corresponding syntax table from the bitstream according to the parsing order.

Table 1 below shows an example of a syntax structure including syntax elements related to palette mode-based coding for a coding unit.

TABLE 1

| | Descriptor |
|---|---|
| palette_coding( x0, y0, cbWidth, cbHeight, treeType ) { | |
|   startComp = ( treeType = = DUAL_TREE_CHROMA ) ? 1 : 0 | |
|   numComps = ( treeType = = SINGLE_TREE ) ? ( sps_chroma_format_idc = = | |
|     0 ? 1 : 3 ) : ( treeType = = DUAL_TREE_CHROMA ) ? 2 : 1 | |
|   maxNumPaletteEntries = ( treeType = = SINGLE_TREE ) ? 31 : 15 | |
|   palettePredictionFinished = 0 | |
|   NumPredictedPaletteEntries = 0 | |
|   for( predictorEntryIdx = 0; predictorEntryIdx < PredictorPaletteSize[ startComp ] | |
|     && !palettePredictionFinished && | |
|     NumPredictedPaletteEntries < maxNumPaletteEntries; predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < maxNumPaletteEntries ) | |
|     num_signalled_palette_entries | ae(v) |
|   for( cIdx = startComp; cIdx < ( startComp + numComps ); cIdx++ ) | |
|     for( i = 0; i < num_signalled_palette_entries; i++ ) | |
|       new_palette_entries[ cIdx ][ i ] | ae(v) |
|   if( CurrentPaletteSize[ startComp ] > 0 ) | |
|     palette_escape_val_present_flag | ae(v) |
|   if( MaxPaletteIndex > 0 ) { | |
|     adjust = 0 | |
|     palette_transpose_flag | ae(v) |
|   } | |
|   if( treeType != DUAL_TREE_CHROMA && alette_escape_val_present_flag ) | |
|     if( pps_cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |

TABLE 1-continued

| | Descriptor |
|---|---|
| ```
if( treeType != DUAL_TREE_LUMA && palette_escape_val_present_flag )
   if( sh_cu_chroma_qp_offset_enabled_flag && !IsCuChromaQpOffsetCoded ) {
      cu_chroma_qp_offset_flag
``` | ae(v) |
| ```
      if( cu_chroma_qp_offset_flag && pps_chroma_qp_offset_list_len_minus1 > 0 )
         cu_chroma_qp_offset_idx
   }
}
PreviousRunPosition = 0
PreviousRunType = 0
for( subSetId = 0; subSetId <= ( cbWidth * cbHeight − 1 ) / 16; subSetId++ ) {
   minSubPos = subSetId * 16
   if( minSubPos + 16 > cbWidth * cbHeight)
      maxSubPos = cbWidth * cbHeight
   else
      maxSubPos = minSubPos + 16
   RunCopyMap[ x0 ][ y0 ] = 0
   PaletteScanPos = minSubPos
   log2CbWidth = Log2( cbWidth )
   log2CbHeight = Log2( cbHeight )
   while( PaletteScanPos < maxSubPos ) {
      xC = x0 + TraverseScanOrder[log2CbWidth][log2CbHeight][PaletteScanPos][0]
      yC = y0 + TraverseScanOrder[log2CbWidth][log2CbHeight][PaletteScanPos][1]
      if( PaletteScanPos > 0 ) {
         xcPrev = x0 +
            TraverseScanOrder[log2CbWidth][log2CbHeight][PaletteScanPos−1][0]
         ycPrev = y0 +
            TraverseScanOrder[log2CbWidth][log2CbHeight][PaletteScanPos−1][1]
      }
      if( MaxPaletteIndex > 0 && PaletteScanPos > 0 ) {
         run_copy_flag
``` | ae(v) |
| ```
         RunCopyMap[ xC ][ yC ] = run_copy_flag
      }
      CopyAboveIndicesFlag[ xC ][ yC ] = 0
      if( MaxPaletteIndex > 0 && !RunCopyMap[ xC ][ yC ] ) {
         if( ( ( !palette_transpose_flag && yC > y0 ) || ( palette_transpose_flag
            && xC > x0 ) ) && CopyAboveIndicesFlag[ xcPrev ][ ycPrev ] = = 0
            && PaletteScanPos > 0 ) {
            copy_above_palette_indices_flag
``` | ae(v) |
| ```
            CopyAboveIndicesFlag[ xC ][ yC ] = copy_above_palette_indices_flag
         }
         PreviousRunType = CopyAboveIndicesFlag[ xC ][ yC ]
         PreviousRunPosition = PaletteScanPos
      } else if( PaletteScanPos > 0 )
         CopyAboveIndicesFlag[ xC ][ yC ] = CopyAboveIndicesFlag[xcPrev][ycPrev]
      PaletteScanPos ++
   }
   PaletteScanPos = minSubPos
   while( PaletteScanPos < maxSubPos ) {
      xC = x0 + TraverseScanOrder[log2CbWidth][log2CbHeight][PaletteScanPos][0]
      yC = y0 + TraverseScanOrder[log2CbWidth][log2CbHeight][PaletteScanPos][1]
      if( PaletteScanPos > 0 ) {
         xcPrev =x0 +
            TraverseScanOrder[ log2CbWidth ][ log2CbHeight ][ PaletteScanPos − 1 ][ 0 ]
         ycPrev = y0 +
            TraverseScanOrder[ log2CbWidth ][ log2CbHeight ][ PaletteScanPos − 1 ][ 1 ]
      }
      if( MaxPaletteIndex > 0 && !RunCopyMap[ xC ][ yC ] &&
         CopyAboveIndicesFlag[ xC ][ yC ] = = 0 ) {
         if( MaxPaletteIndex − adjust > 0 )
            palette_idx_idc
``` | ae(v) |
| ```
         adjust = 1
      }
      if( !RunCopyMap[ xC ][ yC ] && CopyAboveIndicesFlag[ xC ][ yC ] = = 0 )
         CurrPaletteIndex = palette_idx_idc
      if( CopyAboveIndicesFlag[ xC ][ yC ] = = 0 )
         PaletteIndexMap[ xC ][ yC ] = CurrPaletteIndex
      else if( !palette_transpose_flag )
         PaletteIndexMap[ xC ][ yC ] = PaletteIndexMap[ xC ][ yC − 1 ]
      else
         PaletteIndexMap[ xC ][ yC ] = PaletteIndexMap[ xC − 1 ][ yC ]
      PaletteScanPos ++
   }
   if( palette_escape_val_present_flag ) {
      for( cIdx = startComp; cIdx < ( startComp + numComps ); cIdx++ ) {
         for( sPos = minSubPos; sPos < maxSubPos; sPos++ ) {
            xC = x0 + TraverseScanOrder[ log2CbWidth ][ log2CbHeight ][ sPos ][ 0 ]
            yC = y0 + TraverseScanOrder[ log2CbWidth ][ log2CbHeight ][ sPos ][ 1 ]
            if( !( treeType = = SINGLE_TREE && cIdx != 0 &&
               ( xC % SubWidthC != 0 || yC % SubHeightC != 0 ) ) ) {
``` | |

TABLE 1-continued

| | Descriptor |
|---|---|
|                if( PaletteIndexMap[ cIdx ][ xC ][ yC ] = = MaxPaletteIndex ) {<br>                 palette_escape_val<br>                 PaletteEscapeVal[ cIdx ][ xC ][ yC ] = palette_escape_val<br>               }<br>             }<br>           }<br>         }<br>       }<br>     }<br>   }<br>} | ae(v) |

Semantics for syntax elements included in the syntax of Table 1 may be shown in Table 2 below.

TABLE 2

In the following semantics, the array indices x0, y0 specify the location (x0, y0) of the top-left luma sample of the considered coding block relative to the top-left luma sample of the picture. The array indices xC, yC specify the location (xC, yC) of the sample relative to the top-left luma sample of the picture, when treeType is equal to SINGLE_TREE or DUAL_TREE_LUMA; and relative to the top-left chroma sample of the picture, when treeType is equal to DUAL_TREE_CHROMA. The array index startComp specifies the first colour component of the current palette table. startComp equal to 0 indicates the Y component; startComp equal to 1 indicates the Cb component; startComp equal to 2 indicates the Cr component. numComps specifies the number of colour components in the current palette table.
The predictor palette consists of palette entries from previous coding units that are used to predict the entries in the current palette.
PredictorPaletteSize[startComp] specifies the size of the predictor palette for the first colour component of the current palette table startComp.
PredictorPaletteSize[startComp] is derived as specified in subclause 8.4.5.3.
PalettePredictorEntryReuseFlags[i] equal to 1 specifies that the i-th entry in the predictor palette is reused in the current palette. PalettePredictorEntryReuseFlags[i] equal to 0 specifies that the i-th entry in the predictor palette is not an entry in the current palette. All elements of the array PalettePredictorEntryReuseFlags[i] are initialized to 0.
palette_predictor_run is used to determine the number of zeros that precede a non-zero entry in the array PalettePredictorEntryReuseFlags.
It is a requirement of bitstream conformance that the value of palette_predictor_run shall be in the range of 0 to (PredictorPaletteSize[startComp]-predictorEntryIdx), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to maxNumPaletteEntries, inclusive.
num_signalled_palette_entries specifies the number of entries in the current palette that are explicitly signalled for the first colour component of the current palette table startComp.
When num_signalled_palette_entries is not present, it is inferred to be equal to 0.
The variable CurrentPaletteSize[startComp] specifies the size of the current palette for the first colour component of the current palette table startComp and is derived as follows:
    CurrentPaletteSize[ startComp ] = NumPredictedPaletteEntries +
    num_signalled_palette_entries                                                       (176)
The value of CurrentPaletteSize[startComp] shall be in the range of 0 to maxNumPaletteEntries, inclusive.
new_palette_entries[cIdx][i] specifies the value for the i-th signalled palette entry for the colour component cIdx.
The variable LocalDualTreeFlag is derived as follows:
    LocalDualTreeFlag = ( treeType != SINGLE_TREE &&
    ( sh_slice_type != I || ( sh_slice_type = = I &&
    sps_qtbtt_dual_tree_intra_flag = = 0 ) ) ) ? 1 : 0               (177)
The variable PredictorPaletteEntries[cIdx][i] specifies the i-th element in the predictor palette for the colour component cIdx.
The variable CurrentPaletteEntries[cIdx][i] specifies the i-th element in the current palette for the colour component cIdx and is derived as follows:
  numPredictedPaletteEntries = 0
  for( i = 0; i < PredictorPaletteSize[ startComp ]; i++ )
    if( PalettePredictorEntryReuseFlags[ i ] ) {
      for( cIdx = LocalDualTreeFlag ? 0 : startComp; cIdx <
LocalDualTreeFlag ? 3 :
        ( startComp + numComps ), cIdx++ )
        CurrentPaletteEntries[ cIdx ][ numPredictedPaletteEntries ] =
PredictorPaletteEntries[ cIdx ][ i ]
      numPredictedPaletteEntries++
    }

TABLE 2-continued

```
for( cIdx = startComp; cIdx < (startComp + numComps); cIdx++)        (178)
    for( i = 0; i < num_signalled_palette_entries; i++ )
        CurrentPaletteEntries[ cIdx ][ numPredictedPaletteEntries + i ] =
            new_palette_entries[ cIdx ][ i ]
```
palette_escape_val_present_flag equal to 1 specifies that the current coding unit
contains at least one escape coded sample. palette_escape_val_present_flag equal to 0
specifies that there are no escape coded samples in the current coding unit. When not
present, the value of palette_escape_val_present_flag is inferred to be equal to 1.
The variable MaxPaletteIndex specifies the maximum possible value for a palette index
for the current coding unit. The value of MaxPaletteIndex is set equal to
CurrentPaletteSize[startComp] − 1 + palette_escape_val_present_flag.
palette_idx_idc is an indication of an index to the palette table, CurrentPaletteEntries.
The value of palette_idx_idc shall be in the range of 0 to MaxPaletteIndex, inclusive,
for the first index in the block and in the range of 0 to (MaxPaletteIndex − 1), inclusive,
for the remaining indices in the block.
When palette_idx_idc is not present, it is inferred to be equal to 0.
palette_transpose_flag equal to 1 specifies that vertical traverse scan is applied for
scanning the indices for samples in the current coding unit. palette_transpose_flag equal
to 0 specifies that horizontal traverse scan is applied for scanning the indices for samples
in the current coding unit. When not present, the value of palette_transpose_flag is
inferred to be equal to 0.
The array TraverseScanOrder specifies the scan order array for palette coding. If
palette_transpose_flag is equal to 0, TraverseScanOrder is assigned the horizontal scan
order HorTravScanOrder. Otherwise (palette_transpose_flag is equal to 1),
TraverseScanOrder is assigned the vertical scan order VerTravScanOrder.
run_copy_flag equal to 1 specifies that the palette run type is the same as the run type
at the previously scanned position and palette index is the same as the index at the
previous scanned position if CopyAboveIndicesFlag[xC][yC] is equal to 0.
Otherwise, run_copy_flag equal to 0 specifies that the palette run type is different from
the run type at the previously scanned position.
copy_above_palette_indices_flag equal to 1 specifies that the palette index is equal to
the palette index at the same location in the row above if horizontal traverse scan is used
or the same location in the left column if vertical traverse scan is used.
copy_above_palette_indices_flag equal to 0 specifies that an indication of the palette
index of the sample is coded in the bitstream or inferred.
The variable CopyAboveIndicesFlag[xC][yC] equal to 1 specifies that the palette
index is copied from the palette index in the row above (horizontal scan) or left column
(vertical scan). CopyAboveIndicesFlag[xC][yC] equal to 0 specifies that the palette
index is explicitly coded in the bitstream or inferred.
The variable PaletteIndexMap[xC][yC] specifies a palette index, which is an index to
the array represented by CurrentPaletteEntries. The value of
PaletteIndexMap[xC][yC] shall be in the range of 0 to MaxPaletteIndex, inclusive.
The variable adjustedRefPaletteIndex is derived as follows:
```
    adjustedRefPaletteIndex = MaxPaletteIndex + 1
    if( PaletteScanPos > 0 ) {
        xcPrev =
    x0 + TraverseScanOrder[ log2CbWidth ][ log2bHeight ][ PaletteScanPos − 1 ][ 0 ]
        ycPrev =
    y0 + TraverseScanOrder[ log2CbWidth ][ log2bHeight ][ PaletteScanPos − 1 ][ 1 ]
        if( CopyAboveIndicesFlag[ xcPrev ][ ycPrev ] = = 0 )
            adjustedRefPaletteIndex = PaletteIndexMap[ xcPrev ][ ycPrev ]      (179)
        else {
            if( !palette_transpose_flag )
                adjustedRefPaletteIndex = PaletteIndexMap[ xC ][ yC − 1 ]
            else
                adjustedRefPaletteIndex = PaletteIndexMap[ xC − 1 ][ yC ]
        }
    }
```
When CopyAboveIndicesFlag[xC][yC] is equal to 0, the variable CurrPaletteIndex is
derived as follows:
```
    if( CurrPaletteIndex >= adjustedRefPaletteIndex )
        CurrPaletteIndex++                                                      (180)
```
palette_escape_val specifies the quantized escape coded sample value for a component.
The variable PaletteEscapeVal[cIdx][xC][yC] specifies the escape value of a sample
for which PaletteIndexMap[xC][yC] is equal to MaxPaletteIndex and
palette_escape_val_present_flag is equal to 1. The array index cIdx specifies the
colour component.
It is a requirement of bitstream conformance that PaletteEscapeVal[cIdx][xC][yC]
shall be in the range of 0 to (1 << BitDepth) − 1, inclusive.

Referring to Tables 1 and 2, when the palette mode is applied to the current block (i.e., the current coding unit), the palette coding syntax (e.g., palette_coding( ) as in Table 1 above may be parsed/signaled.

For example, a palette table may be constructed based on palette entry information. The palette entry information may include syntax elements such as palette_predictor_run, num_signalled_palette_entries, and new_palette_entries.

In addition, it is possible to construct a palette index map for the current block based on the palette index information. The palette index information may include syntax elements such as num_palette_indices_minus1, palette_idx_idc, and palette_transpose_flag. Based on the palette index information as described above, while traversing according to the traverse scan direction (vertical direction or horizontal direction), the palette index map (e.g., PaletteIndexMap) may be constructed by deriving a palette index (e.g., PaletteIndex-Idc) for samples in the current block.

In addition, it is possible to derive a sample value for the palette entry in the palette table based on the palette index map, and to generate restoration samples of the current block based on the sample value mapped to the palette entry.

Also, when a sample having an escape value exists in the current block (i.e., when the value of palette_escape_val_present_flag is 1), an escape value for the current block may be derived based on the escape information. The escape information may include syntax elements such as palette_escape_val_present_flag and palette_escape_val. For example, an escape value for an escape-coded sample in the current block may be derived based on quantized escape value information (e.g., palette_escape_val). Reconstructed samples of the current block may be generated based on the escape value.

Meanwhile, as described above, the high level syntax (HLS) may be coded/signaled for video/image coding. For example, as described above, the HLS may include a video parameter set (VPS), a sequence parameter set (SPS), a picture parameter set (PPS), an adaptation parameter set (APS), a decoding parameter set (DPS), a slice header, and the like.

For example, a coded picture may be constructed with one or more slices. Parameters describing a coded picture may be signaled in a picture header (PH), and parameters describing a slice may be signaled in a slice header (SH). The PH may be transmitted in its own NAL unit type. The SH may be present at the beginning portion of a NAL unit including a payload of a slice (i.e., slice data). Details of the syntax and semantics of the PH and the SH may be as disclosed in the VVC standard. Each picture may be associated with a PH. A picture may be constructed with different types of slices: intra-coded slices (i.e., I slices) and inter-coded slices (i.e., P-slice and B-slice). As a result, the PH may include syntax elements necessary for an intra slice of a picture and an inter slice of a picture.

Meanwhile, information (syntax elements) in the syntax table disclosed in this document may be included in video/video information, and may be constructed/encoded according to a coding technique performed by the encoding apparatus, and be transmitted to the decoding apparatus in the form of a bitstream. The decoding apparatus may parse/decode information (syntax element) in the corresponding syntax table. The decoding apparatus may perform a decoding process (prediction, (transform skip-based) residual processing, palette coding, etc.) on the current block based on the decoded information, and may reconstruct a block/image/video based on this. Hereinafter, this document proposes a method which can improve coding performance through signaling high level syntax elements in order to efficiently code a block/image/video.

That is, this document proposes a method of efficiently coding and signaling syntax elements related to a chroma quantization parameter offset in a palette coding and/or transform unit coding process during video/image coding. As an embodiment, a method of efficiently signaling information on an offset index among syntax elements related to a chroma quantization parameter offset is proposed.

As described above, quantization parameters Qp may be used for a quantization/dequantization process. In addition, the quantization parameter may be used to derive other parameters in video/image coding. The quantization parameter may include Qp for the luma component and Qp for the chroma component. For example, if the color components of the bitstream are not coded separately, and the bitstream is not a monochrome bitstream (i.e., ChromaArrayType is not 0), then the syntax elements related to the Qp offset for chroma components may be signaled through the HLS (e.g., PPS, slice header, etc.) and coding unit level (e.g., palette coding syntax, transform unit syntax, etc.).

For example, the syntax elements related to the Qp offset for the chroma component may be signaled in the PPS as shown in Table 3 below.

TABLE 3

| | Descriptor |
|---|---|
| pic_parameter_set_rbsp( ) { | |
| ... | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
|   if( pps_cu_chroma_qp_offset_list_enabled_flag ) { | |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       if( pps_joint_cbcr_qp_offset_present_flag ) | |
|         joint_cbcr_qp_offset_list[ i ] | se(v) |
|     } | |
|   } | |
| ... | |
| } | |

Semantics of syntax elements included in the syntax of Table 3 above may be shown as in Table 4 below.

TABLE 4 pps_cb_qp_offset and pps_cr_qp_offset specify the offsets to the luma quantization
parameter Qp'$_Y$ used for deriving Qp'$_{Cb}$ and Qp'$_{Cr}$, respectively. The values of
pps_cb_qp_offset and pps_cr_qp_offset shall be in the range of −12 to +12, inclusive.
When ChromaArrayType is equal to 0, pps_cb_qp_offset and pps_cr_qp_offset are not
used in the decoding process and decoders shall ignore their value.
pps_joint_cbcr_qp_offset_present_flag equal to 1 specifies that
pps_joint_cbcr_qp_offset_value and joint_cbcr_qp_offset_list[i] are present in the PPS
RBSP syntax structure. pps_joint_cbcr_qp_offset_present_flag equal to 0 specifies that
pps_joint_cbcr_qp_offset_value and joint_cbcr_qp_offset_list[i] are not present
in the PPS RBSP syntax structure. When ChromaArrayType is equal to 0 or
sps_joint_cbcr_enabled_flag is equal to 0, the value of
pps_joint_cbcr_qp_offset_present flag shall be equal to 0.
pps_joint_cbcr_qp_offset_value specifies the offset to the luma quantization
parameter Qp'$_Y$ used for deriving Qp'$_{CbCr}$. The value of pps_joint_cbcr_qp_offset_value
shall be in the range of −12 to +12, inclusive. When ChromaArrayType
is equal to 0 or sps_joint_cbcr_enabled_flag is equal to 0,
pps_joint_cbcr_qp_offset_value is not used in the decoding process and decoders shall TABLE 4-continued ignore its value. When pps_joint_cbcr_qp_offset_present_flag is equal to 0,
pps_joint_cbcr_qp_offset_value is not present and is inferred to be equal to 0.
pps_slice_chroma_qp_offsets_present_flag equal to 1 indicates that the
slice_cb_qp_offset and slice_cr_qp_offset syntax elements are present in the
associated slice headers. pps_slice_chroma_qp_offsets_present_flag equal to 0 indicates
that these syntax elements are not present in the associated slice headers. When
ChromaArrayType is equal to 0, pps_slice_chroma_qp_offsets_present_flag shall
be equal to 0.
pps_cu_chroma_qp_offset_list_enabled_flag equal to 1 specifies that the
pic_cu_chroma_qp_offset_subdiv_intra_slice and
pic_cu_chroma_qp_offset_subdiv_inter_slice syntax elements are present in PHs
referring to the PPS and that cu_chroma_qp_offset_flag may be present in the
transform unit syntax and the palette coding syntax.
pps_cu_chroma_qp_offset_list_enabled_flag equal to 0 specifies that the
pic_cu_chroma_qp_offset_subdiv_intra_slice and
pic_cu_chroma_qp_offset_subdiv_inter_slice syntax elements are not present in PHs
referring to the PPS and that the cu_chroma_qp_offset_flag is not present in the
transform unit syntax and the palette coding syntax. When ChromaArrayType is equal
to 0, it is a requirement of bitstream conformance that the value of
pps_cu_chroma_qp_offset_list_enabled_flag shall be equal to 0.
chroma_qp_offset_list_len_minus1 plus 1 specifies the number of
cb_qp_offset_list[i], cr_qp_offset_list[i], and joint_cbcr_qp_offset_list[i], syntax
elements that are present in the PPS RBSP syntax structure. The value of
chroma_qp_offset_list_len_minus1 shall be in the range of 0 to 5, inclusive.
cb_qp_offset_list[i], cr_qp_offset_list[i], and joint_cbcr_qp_offset_list[i],
specify offsets used in the derivation of $Qp'_{Cb}$, $Qp'_{Cr}$, and $Qp'_{CbCr}$, respectively. The
values of cb_qp_offset_list[i], cr_qp_offset_list[i], and joint_cbcr_qp_offset_list[i]
shall be in the range of −12 to +12, inclusive. When
pps_joint_cbcr_qp_offset_present_flag is equal to 0, joint_cbcr_qp_offset_list[i] is
not present and it is inferred to be equal to 0.

Referring to Tables 3 and 4, the syntax elements related to the chroma Qp offset may be parsed/signaled in the PPS. For example, the syntax elements related to the chroma Qp offset in PPS may include pps_cb_qp_offset and pps_cr_qp_offset, pps_joint_cbcr_qp_offset_present_flag, pps_joint_cbcr_qp_offset_value, pps_slice_chroma_qp_offsets_present_flag, pps_cu_chroma_qp_offset_list_enabled_flag, chroma_qp_offset_list_len_minus1, cb_qp_offset_list[i], cr_qp_offset_list[i], joint_cbcr_qp_offset_list[i], and the like, which are as described in Table 4 above.

pps_slice_chroma_qp_offsets_present_flag may be information indicating whether additional syntax elements related to the chroma Qp offset are present in the related slice header. For example, when the value of pps_slice_chroma_qp_offsets_present_flag is 1, additional syntax elements (e.g., slice_cb_qp_offset, slice_cr_qp_offset) may be parsed/signaled in the associated slice header. Alternatively, when the value of pps_slice_chroma_qp_offsets_present_flag is 0, additional syntax elements (e.g., slice_cb_qp_offset, slice_cr_qp_offset) may not be parsed/signaled in the associated slice header.

pps_cu_chroma_qp_offset_list_enabled_flag may be information indicating whether additional syntax elements related to the chroma Qp offset are present in the picture header referring to the PPS. For example, when the value of pps_cu_chroma_qp_offset_list_enabled_flag is 1, additional syntax elements (e.g., pic_cu_chroma_qp_offset_subdiv_intra_slice, pic_cu_chroma_qp_offset_subdiv_inter_slice) may be parsed/signaled in the picture header referring to the PPS. Alternatively, when the value of pps_cu_chroma_qp_offset_list_enabled_flag is 0, additional syntax elements (e.g., pic_cu_chroma_qp_offset_subdiv_intra_slice, pic_cu_chroma_qp_offset_subdiv_inter_slice) may not be parsed/signaled in the picture header referring to the PPS.

In addition, pps_cu_chroma_qp_offset_list_enabled_flag may be information indicating whether cu_chroma_qp_offset_flag is present in the palette coding syntax and the transform unit syntax. For example, when the value of pps_cu_chroma_qp_offset_list_enabled_flag is 1, it may indicate that cu_chroma_qp_offset_flag may be parsed/signaled in the palette coding syntax and the transform unit syntax. Alternatively, when the value of pps_cu_chroma_qp_offset_list_enabled_flag is 0, it may indicate that cu_chroma_qp_offset_flag is not parsed/signaled in the palette coding syntax and the transform unit syntax.

Also, for example, the syntax elements related to the Qp offset for the chroma component may be signaled in a slice header as shown in Table 5 below. As an example, based on the syntax element signaled in the PPS (e.g., when the value of pps_slice_chroma_qp_offsets_present_flag is 1 or when value of pps_cu_chroma_qp_offset_list_enabled_flag is 1), additional syntax elements related to the chroma Qp offset may be signaled through the slice header.

TABLE 5

|  | Descriptor |
|---|---|
| slice_header( ) { | |
| ... | |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( pps_cu_chroma_qp_offset_list_enabled_flag ) | |
|     cu_chroma_qp_offset_enabled_flag | u(1) |
| ... | |
| } | |

Semantics of syntax elements included in the syntax of Table 5 above may be shown as in Table 6 below.

TABLE 6 slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset + slice_cb_qp_offset shall be in the range of −12 to +12, inclusive.
slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset + slice_cr_qp_offset shall be in the range of −12 to +12, inclusive.
slice_joint_cbcr_qp_offset specifies a difference to be added to the value of pps_joint_cbcr_qp_offset_value when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset_value + slice_joint_cbcr_qp_offset shall be in the range of −12 to +12, inclusive.
cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

Referring to Tables 5 and 6, the syntax elements related to the chroma Qp offset may be parsed/signaled in the slice header. For example, the syntax elements related to the chroma Qp offset in the slice header may include slice_cb_qp_offset, slice_cr_qp_offset, slice_joint_cbcr_qp_offset, cu_chroma_qp_offset_enabled_flag, and the like, which are as described in Table 6 above.

For example, when the value of pps_slice_chroma_qp_offsets_present_flag signaled in the PPS is 1, the slice_cb_qp_offset and slice_cr_qp_offset syntax elements may be parsed/signaled in the associated slice header.

Or, as an example, when the value of pps_cu_chroma_qp_offset_list_enabled_flag signaled in the PPS is 1, the cu_chroma_qp_offset_enabled_flag syntax element may be parsed/signaled in the associated slice header.

In this case, the cu_chroma_qp_offset_enabled_flag syntax element may be information regarding whether cu_chroma_qp_offset_flag is present in the palette coding syntax and the transform unit syntax. For example, when the value of cu_chroma_qp_offset_enabled_flag is 1, it may indicate that cu_chroma_qp_offset_flag may be parsed/signaled in the palette coding syntax and the transform unit syntax. Alternatively, when the value of cu_chroma_qp_offset_enabled_flag is 0, it may indicate that cu_chroma_qp_offset_flag is not parsed/signaled in the palette coding syntax and the transform unit syntax.

Also, for example, the syntax elements related to the Qp offset for the chroma component may be signaled at a CU level (e.g., palette coding syntax, transform unit syntax) as shown in Tables 7 and 8 below. As an example, based on the syntax element signaled in the slice header (e.g., when the value of cu_chroma_qp_offset_enabled_flag is 1), additional syntax elements related to the chroma Qp offset may be signaled through the palette coding syntax and the transform unit syntax.

TABLE 7

|  | Descriptor |
|---|---|
| palette_coding( x0, y0, cbWidth, cbHeight, treeType ) { | |
|    ... | |
|    if( treeType != DUAL_TREE_LUMA && palette_escape_val_present_flag ) | |
|      if( cu_chroma_qp_offset_enabled_flag && !IsCuChromaQpOffsetCoded ) { | |
|         cu_chroma_qp_offset_flag | ae(v) |
|         if( cu_chroma_qp_offset_flag ) | |
|           cu_chroma_qp_offset_idx | ae(v) |
|      } | |
|    ... | |
| } | |

TABLE 8

|  | Descriptor |
|---|---|
| transform_unit( x0, y0, tbWidth, tbHeight, treeType, subTuIndex, chType ) { | |
|    ... | |
|    if( ( CbWidth[ chType ][ x0 ][ y0 ] > 64 \|\| CbHeight[ chType ][ x0 ][ y0 ] > 64 | |
|      \|\| ( chromaAvailable && ( tu_cbf_cb[ xC ][ yC ] \|\| | |
|      tu_cbf_cr[ xC ][ yC ] ) ) ) && treeType != DUAL_TREE_LUMA ) { | |

TABLE 8-continued

| | Descriptor |
|---|---|
| `  if( cu_chroma_qp_offset_enabled_flag && !IsCuChromaQpOffsetCoded) {` | |
| `    cu_chroma_qp_offset_flag` | ae(v) |
| `    if( cu_chroma_qp_offset_flag && chroma_qp_offset_list_len_minus1 > 0 )` | |
| `      cu_chroma_qp_offset_idx` | ae(v) |
| `  }` | |
| `  }` | |
| `}` | |

Semantics of syntax elements included in the syntax of Tables 7 and 8 above may be shown as in Table 9 below.

TABLE 9 cu_chroma_qp_offset_flag when present and equal to 1, specifies that an entry in the cb_qp_offset_list[ ] is used to determine the value of CuQpOffset$_{Cb}$, a corresponding entry in the cr_qp_offset_list[ ] is used to determine the value of CuQpOffset$_{Cr}$, and a corresponding entry in the joint_cbcr_qp_offset_list[ ] is used to determine the value of CuQpOffset$_{CbCr}$. cu_chroma_qp_offset_flag equal to 0 specifies that these lists are not used to determine the values of CuQpOffset$_{Cb}$, CuQpOffset$_{Cr}$, and CuQpOffset$_{CbCr}$.
cu_chroma_qp_offset_idx, when present, specifies the index into the cb_qp_offset_list[ ], cr_qp_offset_list[ ], and joint_cbcr_qp_offset_list[ ] that is used to determine the value of CuQpOffset$_{Cb}$, CuQpOffset$_{Cr}$, and CuQpOffset$_{CbCr}$. When present, the value of cu_chroma_qp_offset_idx shall be in the range of 0 to chroma_qp_offset_list_len_minus1, inclusive. When not present, the value of cu_chroma_qp_offset_idx is inferred to be equal to 0.
When cu_chroma_qp_offset_flag is present, the following applies:
- The variable IsCuChromaQpOffsetCoded is set equal to 1.
- The variables CuQpOffset$_{Cb}$, CuQpOffset$_{Cr}$, and CuQpOffset$_{CbCr}$ are derived as follows:
  - If cu_chroma_qp_offset_flag is equal to 1, the following applies:
    CuQpOffset$_{Cb}$ = cb_qp_offset_list[cu_chroma_qp_offset_idx]        (7-151)
    CuQpOffset$_{Cr}$ = cr_qp_offset_list[cu_chroma_qp_offset_idx]        (7-152)
    CuQpOffset$_{CbCr}$ = joint_cbcr_qp_offset_list[cu_chroma_qp_offset_idx]    (7-153)
  - Otherwise (cu_chroma_qp_offset_flag is equal to 0), CuQpOffset$_{Cb}$, CuQpOffset$_{Cr}$, and CuQpOffset$_{CbCr}$ are all set equal to 0.

Referring to Tables 7 to 9. the syntax elements related to the chroma Qp offset may be parsed/signaled in the palette coding syntax and/or the transform unit syntax. For example, syntax elements related to chroma Qp offset in the palette coding syntax and/or transform unit syntax may include cu_chroma_qp_offset_flag, cu_chroma_qp_offset_idx, and the like, which are as described in Table 9 above.

As an example, based on a case in which the value of cu_chroma_qp_offset_enabled_flag signaled in the slice header is 1, the cu_chroma_qp_offset_flag syntax element may be parsed/signaled in the palette coding syntax and/or the transform unit syntax.

Also, as an example, based on the case where the value of the cu_chroma_qp_offset_flag is 1, the cu_chroma_qp_offset_idx syntax element may be parsed/signaled in the palette coding syntax and/or the transform unit syntax.

Here, cu_chroma_qp_offset_flag may be information indicating whether a chroma Qp offset list (e.g., cb_qp_offset_list, cr_qp_offset_list, joint_cbcr_qp_offset) is used to determine the value of the chroma Qp offset (e.g., CuQpOffsetCb, CuQpOffsetCr, CuQpOffsetCbCr). For example, when the value of cu_chroma_qp_offset_flag is 1, it may indicate that the chroma Qp offset list is used to determine the value of the chroma Qp offset. Alternatively, when the value of cu_chroma_qp_offset_flag is 0, it may indicate that the chroma Qp offset list is not used to determine the value of the chroma Qp offset.

cu_chroma_qp_offset_idx may be information indicating the index for the chroma Qp offset list (e.g., cb_qp_offset_list, cr_qp_offset_list, joint_cbcr_qp_offset_list) used to determine the value of the chroma Qp offset (e.g., CuQpOffsetCb, CuQpOffsetCr, CuQpOffsetCbCr). For example, if cu_chroma_qp_offset_idx is present, the value of cu_chroma_qp_offset_idx should be in the range of 0 to chroma_qp_offset_list_len_minus1. Alternatively, when cu_chroma_qp_offset_idx is not present, the value of cu_chroma_qp_offset_idx may be inferred to be 0.

Meanwhile, the currently designed signaling method for syntax elements related to the chroma Qp offset may not be an optimized design, and in particular, it may not be an optimal case for signaling information about the chroma Qp offset in the palette coding syntax table. As shown above, when the value of cu_chroma_qp_offset_flag is 1, the syntax element cu_chroma_qp_offset_idx is always signaled regardless of the value of chroma_qp_offset_list_len_minus1, which is information on the number of chroma Qp offset lists. When the value of chroma_qp_offset_list_len_minus1 is 0 (that is, when there is only one set of chroma Qp offsets in cb_qp_offset_list[i], cr_qp_offset_list[i], joint_cbcr_qp_offset_list[i]), the redundancy may occur. When the value of chroma_qp_offset_list_len_minus1 is 0, the possible value of cu_chroma_qp_offset_idx is only 0, so in this case, there is no need to signal cu_chroma_qp_offset_idx.

Accordingly, this document provides a method for solving the above-described problems. That is, this document provides a method by which syntax elements related to the chroma Qp offset can be efficiently parsed/signaled through the palette coding syntax and/or the transform unit syntax. For example, information on the chroma Qp offset index (e.g., cu_chroma_qp_offset_idx) can be efficiently signaled through the palette coding syntax and/or the transform unit syntax based on a condition for the number-related information of the chroma Qp offset list (e.g., chroma_qp_offset_list_len_minus1) as follows. Each of the following items may be applied individually or in combination.

1. When the value of cu_chroma_qp_offset_flag is 1 and there is only one set of chroma Qp offsets (i.e., when the value of chroma_qp_offset_list_len_minus1 is 0), the syntax element indicating the index of the chroma Qp offset (e.g., cu_chroma_qp_offset_idx) may not be signaled for palette coding. In this case, a syntax element (e.g., cu_chroma_qp_offset_idx) indicating the index of the chroma Qp offset may be inferred to be 0. For example, it may be shown as in Tables 10 and 11 to be described later.
2. Alternatively, when the value of cu_chroma_qp_offset_flag is 1, the syntax element (e.g., cu_chroma_qp_offset_idx) indicating the index of the chroma Qp offset may be always signaled. For example, it may be shown as in Tables 12 and 13 to be described later.

As an embodiment, information on the index of the chroma Qp offset may be signaled through a palette coding syntax as shown in Table 10 below.

Referring to Tables 10 and 11 above, cu_chroma_qp_offset_flag and cu_chroma_qp_offset_idx syntax elements may be parsed/signaled in the palette coding syntax.

The cu_chroma_qp_offset_flag syntax element may be parsed/signaled through the palette coding syntax based on whether the value of cu_chroma_qp_offset_enabled_flag is 1. Here, the cu_chroma_qp_offset_flag syntax element may be information related to whether the chroma Qp offset list (e.g., cb_qp_offset_list, cr_qp_offset_list, joint_cbcr_list, joint_cbcr_list) is used to determine a value of a chroma Qp offset (e.g., CuQpOffsetCb, CuQpOffsetCr, CuQpOffsetCbCr).

For example, the cu_chroma_qp_offset_enabled_flag syntax element is information parsed/signaled in the slice header as described above, and when this value is 1, it indicates that cu_chroma_qp_offset_flag may be present in the palette coding syntax and the transform unit syntax. That is, based on a case in which the value of cu_chroma_qp_offset_enabled_flag is 1, cu_chroma_qp_offset_flag may be parsed/signaled in the palette coding syntax.

The cu_chroma_qp_offset_idx syntax element may be parsed/signaled through the palette coding syntax based on the cu_chroma_qp_offset_flag and chroma_qp_offset_list_len_minus 1 syntax elements. That is, based on information on whether to use the chroma Qp offset list to derive the value of the chroma Qp offset (e.g., cu_chro-

TABLE 10

| | Descriptor |
|---|---|
| palette_coding( x0, y0, cbWidth, cbHeight, treeType ) { | |
| ... | |
|   if( treeType != DUAL_TREE_LUMA && palette_escape_val_present_flag ) | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag && chroma_qp_offset_list_len_minus1 > 0 ) | |
|         cu_chroma_qp_offset_idx | ae(v) |
|     } | |
| ... | |
| } | |

Semantics of syntax elements included in the syntax of Table 10 above may be shown as in Table 11 below.

ma_qp_offset_flag) and information on the number of chroma Qp offset lists (e.g., chroma_qp_offset_list_len_mi-

TABLE 11 cu_chroma_qp_offset_flag when present and equal to 1, specifies that an entry in the cb_qp_offset_list[ ] is used to determine the value of CuQpOffset$_{Cb}$, a corresponding entry in the cr_qp_offset_list[ ] is used to determine the value of CuQpOffset$_{Cr}$, and a corresponding entry in the joint_cbcr_qp_offset_list[ ] is used to determine the value of CuQpOffset$_{CbCr}$. cu_chroma_qp_offset_flag equal to 0 specifies that these lists are not used to determine the values of CuQpOffset$_{Cb}$, CuQpOffset$_{Cr}$, and CuQpOffset$_{CbCr}$.
cu_chroma_qp_offset_idx, when present, specifies the index into the cb_qp_offset_list[ ], cr_qp_offset_list[ ], and joint_cbcr_qp_offset_list[ ] that is used to determine the value of CuQpOffset$_{Cb}$, CuQpOffset$_{Cr}$, and CuQpOffset$_{CbCr}$. When present, the value of cu_chroma_qp_offset_idx shall be in the range of 0 to chroma_qp_offset_list_len_minus1, inclusive. When not present, the value of cu_chroma_qp_offset_idx is inferred to be equal to 0.
When cu_chroma_qp_offset_flag is present, the following applies:
- The variable IsCuChromaQpOffsetCoded is set equal to 1.
- The variables CuQpOffset$_{Cb}$, CuQpOffset$_{Cr}$, and CuQpOffset$_{CbCr}$ are derived as follows:
  - If cu_chroma_qp_offset_flag is equal to 1, the following applies:
    CuQpOffset$_{Cb}$ = cb_qp_offset_list[cu_chroma_qp_offset_idx]     (7-151)
    CuQpOffset$_{Cr}$ = cr_qp_offset_list[cu_chroma_qp_offset_idx]     (7-152)
    CuQpOffset$_{CbCr}$ = joint_cbcr_qp_offset_list[cu_chroma_qp_offset_idx]     (7-153)
Otherwise (cu_chroma_qp_offset_flag is equal to 0), CuQpOffset$_{Cb}$, CuQpOffset$_{Cr}$, and CuQpOffset$_{CbCr}$ are all set equal to 0.

nus1), Information on the chroma Qp offset index (e.g., cu_chroma_qp_offset_idx) may be parsed/signaled from the palette coding syntax.

For example, when the value of cu_chroma_qp_offset_flag is 1 and a condition where the value of chroma_qp_offset_list_len_minus is greater than 0 is satisfied, the cu_chroma_qp_offset_idx syntax element may be parsed/signaled in the palette coding syntax.

Here, as described above, the cu_chroma_qp_offset_idx syntax element may be information indicating the index for the chroma Qp offset list (e.g., cb_qp_offset_list, cr_qp_offset_list, joint_cbcr_qp_offset_list) used to determine the value of the chroma Qp offset(e.g., CuQpOffsetCb, CuQpOffsetCr, CuQpOffsetCbCr). The value of cu_chroma_qp_offset_idx should be in the range of 0 to chroma_qp_offset_list_len_minus1.

The chroma Qp offset value may be derived based on the value of the cu_chroma_qp_offset_idx. For example, as shown in Table 11 above, the offset value indicated by cu_chroma_qp_offset_idx is derived from among the offset values in the chroma Qp offset list (e.g., cb_qp_offset_list, cr_qp_offset_list, joint_cbcr_qp_offset_list), and this value may be derived as a value of the chroma Qp offset (e.g., CuQpOffsetCb, CuQpOffsetCr, CuQpOffsetCbCr).

In addition, the value of the chroma Qp offset (e.g., CuQpOffsetCb, CuQpOffsetCr, CuQpOffsetCbCr) may be used to derive the value of the chroma quantization parameter (e.g., Qp'Cb, Qp'Cr, Qp'CbCr). That is, the chroma quantization parameter may be derived based on the value of the chroma Qp offset, and a scaling process (quantization/dequantization) may be performed based on the derived chroma quantization parameter. In addition, when the palette coding mode is applied, the quantization parameter used in the palette mode may be derived based on the derived chroma quantization parameters (e.g., Qp'Cb, Qp'Cr, Qp'CbCr). In this case, the quantization parameter used in the palette mode may be used to derive an escape value for an escape-coded sample in the current block. That is, based on the quantization parameter in the palette mode derived from the chroma quantization parameter (e.g., Qp'Cb, Qp'Cr, Qp'CbCr), an escape value for an escape-coded sample in the current block may be derived from the quantized escape value (e.g., palette_escape_val). Reconstructed samples of the current block may be generated based on the escape value.

According to the above-described embodiment, it can be understood that the information on the chroma Qp offset index (e.g., cu_chroma_qp_offset_idx) is obtained from the palette coding syntax only when the condition for information related to the number of chroma Qp offset lists (e.g., chroma_qp_offset_list_len_minus1) is additionally satisfied. By adding this condition, when only one offset is present in the chroma Qp offset list, information on the chroma Qp offset index (e.g., cu_chroma_qp_offset_idx) may not be signaled. Accordingly, by preventing such unnecessary information from being signaled, it is possible to provide an optimal signaling design for information related to the chroma Qp offset, thereby improving palette coding efficiency.

Alternatively, information on the index of the chroma Qp offset may be signaled through a transform unit syntax as shown in Table 12 below.

TABLE 12

| | Descriptor |
|---|---|
| transform_unit( x0, y0, tbWidth, tbHeight, treeType, subTuIndex, chType ) { <br> ... <br> if( ( CbWidth[ chType ][ x0 ][ y0 ] > 64 \|\| CbHeight[ chType ][ x0 ][ y0 ] > 64 <br>   \|\| ( chromaAvailable && ( tu_cbf_cb[ xC ][ yC ] \|\| tu_cbf_cr[ xC ][ yC ] ) ) ) <br>   && treeType != DUAL_TREE_LUMA ) { <br>   if( cu_chroma_qp_offset_enabled_flag && !IsCuChromaQpOffsetCoded) { <br>     cu_chroma_qp_offset_flag <br>     if( cu_chroma_qp_offset_flag ) <br>       cu_chroma_qp_offset_idx <br>   } <br> } <br> } | <br><br><br><br><br><br>ae(v)<br><br>ae(v) |

Semantics of syntax elements included in the syntax of Table 12 above may be shown as in Table 13 below.

TABLE 13 cu_chroma_qp_offset_flag when present and equal to 1, specifies that an entry in the cb_qp_offset_list[ ] is used to determine the value of CuQpOffset$_{Cb}$, a corresponding entry in the cr_qp_offset_list[ ] is used to determine the value of CuQpOffset$_{Cr}$, and a corresponding entry in the joint_cbcr_qp_offset_list[ ] is used to determine the value of CuQpOffset$_{CbCr}$. cu_chroma_qp_offset_flag equal to 0 specifies that these lists are not used to determine the values of CuQpOffset$_{Cb}$, CuQpOffset$_{Cr}$, and CuQpOffset$_{CbCr}$.
cu_chroma_qp_offset_idx, when present, specifies the index into the cb_qp_offset_list[ ], cr_qp_offset_list[ ], and joint_cbcr_qp_offset_list[ ] that is used to determine the value of CuQpOffset$_{Cb}$, CuQpOffset$_{Cr}$, and CuQpOffset$_{CbCr}$. When present, the value of cu_chroma_qp_offset_idx shall be in the range of 0 to chroma_qp_offset_list_len_minus1, inclusive.
When cu_chroma_qp_offset_flag is present, the following applies:
- The variable IsCuChromaQpOffsetCoded is set equal to 1.
- The variables CuQpOffset$_{Cb}$, CuQpOffset$_{Cr}$, and CuQpOffset$_{CbCr}$ are derived as follows:
  - If cu_chroma_qp_offset_flag is equal to 1, the following applies:
    CuQpOffset$_{Cb}$ = cb_qp_offset_list[cu_chroma_qp_offset_idx]     (7-151)

TABLE 13-continued

CuQpOffset$_{Cr}$ = cr_qp_offset_list[cu_chroma_qp_offset_idx]   (7-152)
CuQpOffset$_{CbCr}$ = joint_cbcr_qp_offset_list[cu_chroma_qp_offset_idx]   (7-153)
Otherwise (cu_chroma_qp_offset_flag is equal to 0), CuQpOffset$_{Cb}$, CuQpOffset$_{Cr}$, and CuQpOffset$_{CbCr}$ are all set equal to 0.

Referring to Tables 12 and 13 above, cu_chroma_qp_offset_flag and cu_chroma_qp_offset_idx syntax elements may be parsed/signaled in the transform unit syntax.

The cu_chroma_qp_offset_flag syntax element may be parsed/signaled through the transform unit syntax based on whether the value of cu_chroma_qp_offset_enabled_flag is 1. As described above, the cu_chroma_qp_offset_flag syntax element may be information related to whether the chroma Qp offset list (e.g., cb_qp_offset_list, cr_qp_offset_list, joint_cbcr_list, joint_cbcr_list) is used to determine a value of a chroma Qp offset (e.g., CuQpOffsetCb, CuQpOffsetCr, CuQpOffsetCbCr).

For example, the cu_chroma_qp_offset_enabled_flag syntax element is information parsed/signaled in the slice header as described above, and when this value is 1, it indicates that cu_chroma_qp_offset_flag may be present in the palette coding syntax and the transform unit syntax. That is, based on a case in which the value of cu_chroma_qp_offset_enabled_flag is 1, cu_chroma_qp_offset_flag may be parsed/signaled in the transform unit syntax.

The cu_chroma_qp_offset_idx syntax element may be parsed/signaled through the transform unit syntax based on the cu_chroma_qp_offset_flag syntax element. That is, based on information on whether to use the chroma Qp offset list to derive the chroma Qp offset value (e.g., cu_chroma_qp_offset_flag), information on the chroma Qp offset index (e.g., cu_chroma_qp_offset_idx) may be parsed/signaled from the transform unit syntax.

For example, when a condition in which the value of cu_chroma_qp_offset_flag is 1 is satisfied, the cu_chroma_qp_offset_idx syntax element may be parsed/signaled in the transform unit syntax.

Here, as described above, the cu_chroma_qp_offset_idx syntax element may be information indicating the index for the chroma Qp offset list (e.g., cb_qp_offset_list, cr_qp_offset_list, joint_cbcr_qp_offset_list) used to determine the value of the chroma Qp offset (e.g., CuQpOffsetCb, CuQpOffsetCr, CuQpOffsetCbCr). The value of cu_chroma_qp_offset_idx should be in the range of 0 to chroma_qp_offset_list_len_minus1.

The chroma Qp offset value may be derived based on the value of the cu_chroma_qp_offset_idx. For example, as shown in Table 13 above, the offset value indicated by cu_chroma_qp_offset_idx is derived from among the offset values in the chroma Qp offset list (e.g., cb_qp_offset_list, cr_qp_offset_list, joint_cbcr_qp_offset_list), and this value may be derived as a value of the chroma Qp offset (e.g., CuQpOffsetCb, CuQpOffsetCr, CuQpOffsetCbCr).

In addition, the value of the chroma Qp offset (e.g., CuQpOffsetCb, CuQpOffsetCr, CuQpOffsetCbCr) may be used to derive the value of the chroma quantization parameter (e.g., Qp'Cb, Qp'Cr, Qp'CbCr). That is, the chroma quantization parameter may be derived based on the value of the chroma Qp offset, and a scaling process (dequantization process) may be performed based on the derived chroma quantization parameter. For example, based on the chroma quantization parameters (e.g., Qp'Cb, Qp'Cr, Qp'CbCr) derived from the chroma Qp offset (e.g., CuQpOffsetCb, CuQpOffsetCr, CuQpOffsetCbCr), transform coefficients may be derived by performing a scaling process (dequantization process) on the quantized transform coefficients of the current block. Reconstructed samples of the current block may be generated based on the derived transform coefficients.

The following drawings were prepared to explain a specific example of the present document. Since the names or specific terms, or names of specific devices described in the drawings (e.g., names of syntax/syntax elements, etc.) are presented as examples, the technical features of the present document are not limited to the specific names used in the following drawings.

Figure 12:
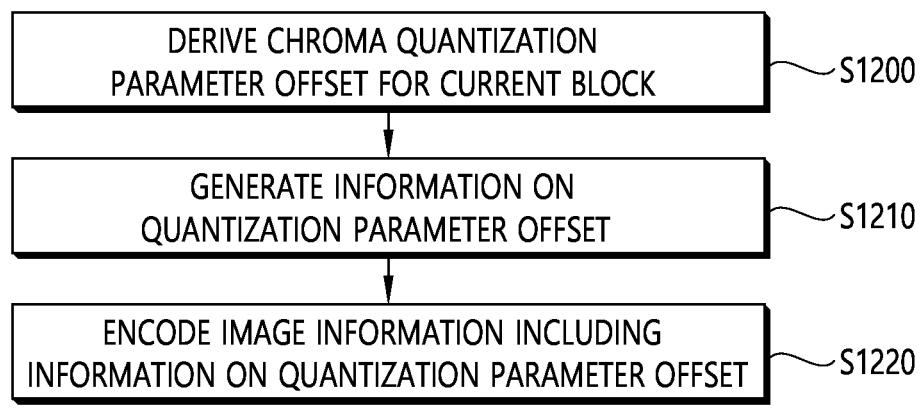
FIGS. 12 and 13 schematically illustrate a video/image encoding method and an example of related components according to embodiment(s) of the present document.
Figure 13:
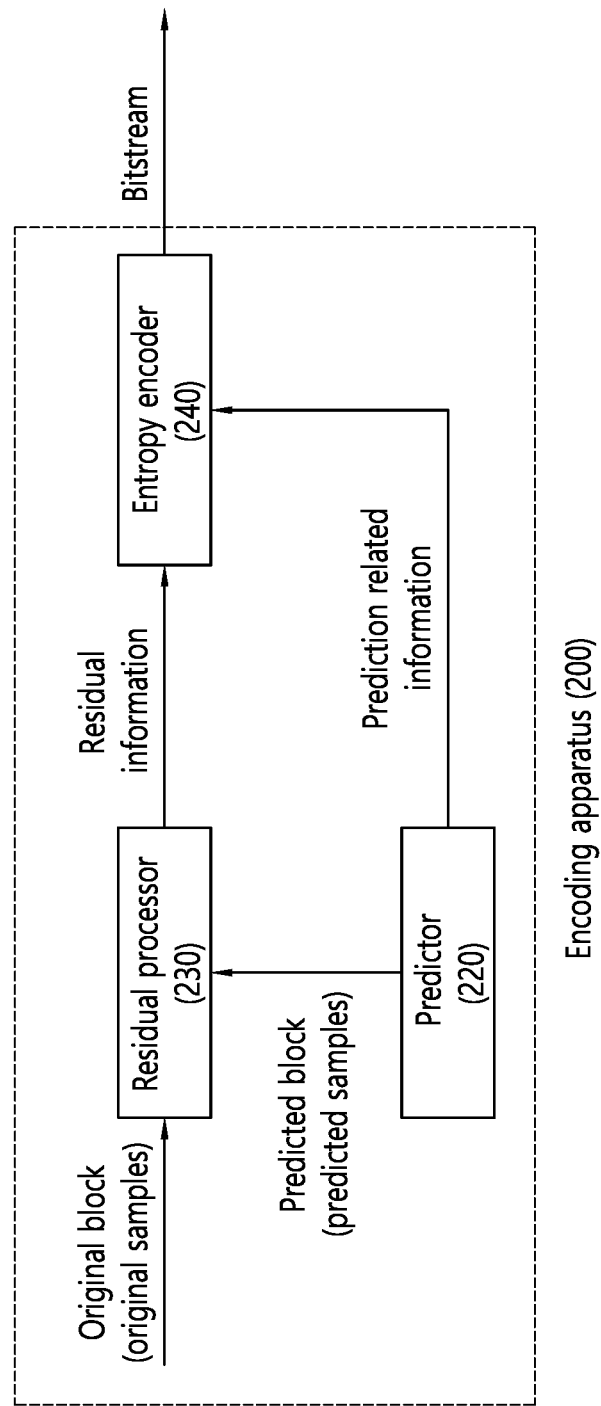

FIGS. 12 and 13 schematically represent an example of a video/image encoding method and associated components according to the embodiment(s) of this document.

The method disclosed in FIG. 12 may be performed by the encoding apparatus 200 disclosed in FIG. 2 or FIG. 13. Here, the encoding apparatus 200 disclosed in FIG. 13 is a simplified representation of the encoding apparatus 200 disclosed in FIG. 2. Specifically, steps S1200 to S1210 of FIG. 12 may be performed by the residual processor 230 disclosed in FIG. 2, and step S1220 of FIG. 12 may be performed by the entropy encoder 240 disclosed in FIG. 2. In addition, although not shown, the process of deriving a prediction sample may be performed by the predictor 220 of the encoding apparatus 200; the process of generating a reconstructed sample and a reconstructed picture for the current block based on the residual sample and the prediction sample for the current block may be performed by the adder 250 of the encoding apparatus 200; and the process of encoding the prediction information for the current block may be performed by an entropy encoder 240 of the encoding apparatus 200. In addition, the method disclosed in FIG. 12 may be performed including the embodiments described above in this document. Accordingly, in FIG. 12, a detailed description of contents corresponding to the repetition of the above-described embodiments will be omitted or simplified.

Referring to FIG. 12, the encoding apparatus may derive a chroma quantization parameter offset for the current block (S1200).

As an embodiment, the encoding apparatus may derive a residual block (residual samples) based on a block (prediction samples) predicted through intra/inter/IBC/palette prediction, etc., and may derive quantized transform coefficients by applying transform and quantization to the derived residual samples. Information on the quantized transform coefficients (residual information) may be included in the residual coding syntax, and be output in the form of a bitstream after encoding.

As described above, the quantization parameter may be used in applying the quantization process. The quantization parameter may include a quantization parameter QPY for a luma component (luma sample) and a quantization parameter QPC for a chroma component (chroma sample). For example, if the color components of the bitstream are not separately coded and the bitstream is not a monochrome bitstream (i.e., ChromaArrayType is not 0), the quantization parameters for the chroma components can be derived.

A quantization parameter for a chroma component (i.e., a chroma quantization parameter) may be derived based on a value of the chroma quantization parameter offset. In an embodiment, the value of the chroma quantization parameter offset may be derived based on the chroma quantization parameter offset list. For example, as described in Tables 10 to 13 above, the value of the chroma quantization parameter offset (e.g., CuQpOffsetCb, CuQpOffsetCr, CuQpOffsetCbCr) may be derived from a chroma quantization parameter offset list (e.g., cb_qp_offset_list, cr_qp_offset_list, joint_cbcr_qp_offset_list) based on index information (e.g., cu_chroma_qp_offset_idx) on the chroma quantization parameter offset list. In other words, the offset value indicated by the index information (e.g., cu_chroma_qp_offset_idx) from among the offset values (entries) in the chroma quantization parameter offset list may be derived as the chroma quantization parameter offset value.

According to an embodiment, the palette coding may be applied to the current block. That is, when the palette mode is applied to the current block, the encoding apparatus may derive a chroma quantization parameter (e.g., Qp'Cb, Qp'Cr, Qp'CbCr) based on the value of the chroma quantization parameter offset (e.g., CuQpOffsetCb, CuQpOffsetCr, CuQpOffsetCbCr). In addition, the encoding apparatus may derive a quantization parameter QP used in the palette mode based on the chroma quantization parameters (e.g., Qp'Cb, Qp'Cr, Qp'CbCr). In this case, the quantization parameter Qp used in the palette mode may be used to derive an escape value for an escape-coded sample in the current block. That is, based on the quantization parameter Qp in the palette mode derived from the chroma quantization parameter (e.g., Qp'Cb, Qp'Cr, Qp'CbCr), the encoding apparatus may generate a quantized escape value (e.g., palette_escape_val) by applying quantization to the escape-coded sample in the current block. The detailed description of the palette coding has been provided through Tables 1 to 2 above.

The encoding apparatus may generate information on the chroma quantization parameter offset (S1210).

As an embodiment, the encoding apparatus may generate index information indicating the derived chroma quantization parameter offset value from among offset values (entries) in the chroma quantization parameter offset list. That is, the encoding apparatus may generate index information (e.g., cu_chroma_qp_offset_idx) on the chroma quantization parameter offset list as information on the chroma quantization parameter offset.

The encoding apparatus may encode image information (or video information) (S1220). Here, the image information may include various information derived from an encoding process, and may be encoded including such various information.

For example, the image information may include the residual information. The residual information, which is information generated through a transform and/or quantization procedure, may be information on quantized transform coefficients, for example, and may include value information of the quantized transform coefficients, location information, transform technique, transform kernel, quantization parameter, or the like.

Also, for example, the image information may include information related to the prediction (e.g., prediction mode information) used to derive the prediction samples.

Additionally, for example, the image information may include information on a chroma quantization parameter offset used to derive the chroma quantization parameter. Here, the information on the chroma quantization parameter offset may include index information on the chroma quantization parameter offset list.

In addition, image information according to an embodiment of the present document may include various information according to the embodiment(s) described above, and may include information disclosed in at least one of Tables 1 to 13 described above.

For example, the image information may include a palette coding syntax. The palette coding syntax may include various information for performing palette coding on the current block as described above.

For example, the palette coding syntax may include information on a chroma quantization parameter offset. The information on the chroma quantization parameter offset may be index information (e.g., cu_chroma_qp_offset_idx syntax element) for the chroma quantization parameter offset list described in Tables 7 to 13 above. In this case, index information (e.g., cu_chroma_qp_offset_idx syntax element) for the chroma quantization parameter offset list may be included in the palette coding syntax based on information on the number of entries in the chroma quantization parameter offset list. Information on the number of entries in the chroma quantization parameter offset list may be a chroma_qp_offset_list_len_minus1 syntax element described in Tables 7 to 13 above. For example, a value obtained by adding 1 to the value of the chroma_qp_offset_list_len_minus 1 syntax element may be derived as the number of entries in the chroma quantization parameter offset list.

As an example, based on a case in which the value of information on the number of entries in the chroma quantization parameter offset list (e.g., chroma_qp_offset_list_len_minus1) is greater than 0, index information (e.g., cu_chroma_qp_offset_idx) on the chroma quantization parameter offset list may be included in the palette coding syntax.

Alternatively, as an example, based on a case in which the value of information on the number of entries in the chroma quantization parameter offset list (e.g., chroma_qp_offset_list_len_minus1) is 0, index information (e.g., cu_chroma_qp_offset_idx) on the chroma quantization parameter offset list may not be included in the palette coding syntax. In this case, the value of index information (e.g., cu_chroma_qp_offset_idx) for the chroma quantization parameter offset list that is not included in the palette coding syntax may be inferred to be 0.

Additionally, for example, the palette coding syntax may include flag information on whether the chroma quantization parameter offset list is used to derive a value of the chroma quantization parameter offset. The flag information may be a cu_chroma_qp_offset_flag syntax element described in Tables 7 to 13 above. As an example, based on a case where the value of the flag information (e.g., cu_chroma_qp_offset_flag) is 1 and the value of information on the number of entries in the chroma quantization parameter offset list (e.g., chroma_qp_offset_list_len_minus1) is greater than 0, index information (e.g., cu_chroma_qp_offset_idx) on the chroma quantization parameter offset list may be included in the palette coding syntax.

Also, for example, the image information may include first enabled flag information on whether the flag information (e.g., cu_chroma_qp_offset_flag) exists in the palette coding syntax. The first enabled flag information may be a cu_chroma_qp_offset_enabled_flag syntax element described in Tables 5 to 6, and may be included in a slice header of image information. For example, based on the value of the first enabled flag information (e.g., cu_chroma_qp_offset_enabled_flag) being 1, the flag information (e.g., cu_chroma_qp_offset_flag) may be included in the palette coding syntax.

Also, for example, the image information may include second enabled flag information on whether the flag information (e.g., cu_chroma_qp_offset_flag) exists in the palette coding syntax. The second enabled a flag information may be pps_cu_chroma_qp_offset_list_enabled_flag syntax element described in Tables 3 and 4, and may be included in a picture parameter set (PPS) of image information. In an example, based on the value of the second enabled flag information (e.g., pps_cu_chroma_qp_offset_list_enabled_flag) being 1, the first enabled flag information (e.g., cu_chroma_qp_offset_enabled_flag) may be included in the slice header.

Image information including various information as described above may be encoded and output in the form of a bitstream. The bitstream may be transmitted to the decoding apparatus through a network or a (digital) storage medium. Here, the network may include a broadcast network, a communication network and/or the like, and the digital storage medium may include various storage media, such as USB, SD, CD, DVD, Blu-ray, HDD, SSD, and the like.

Figure 14:
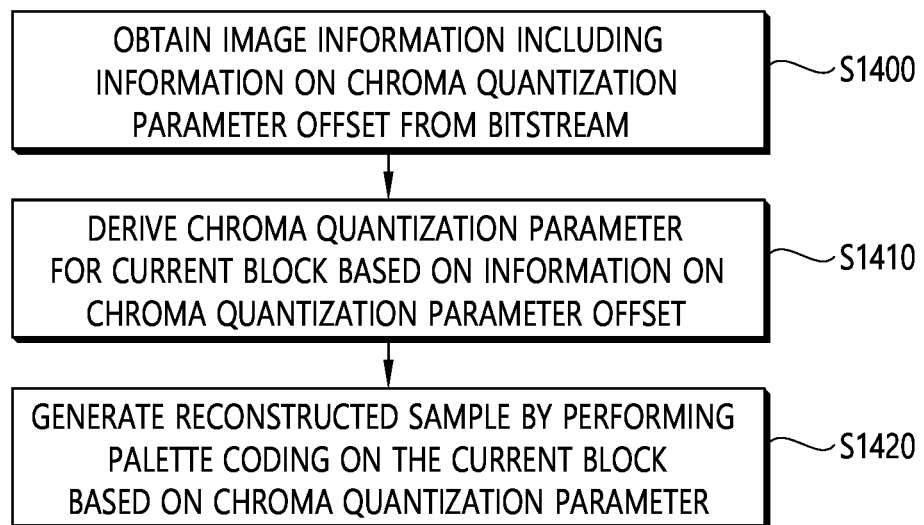
FIGS. 14 and 15 schematically illustrate a video/image decoding method and an example of related components according to embodiment(s) of the present document
Figure 15:
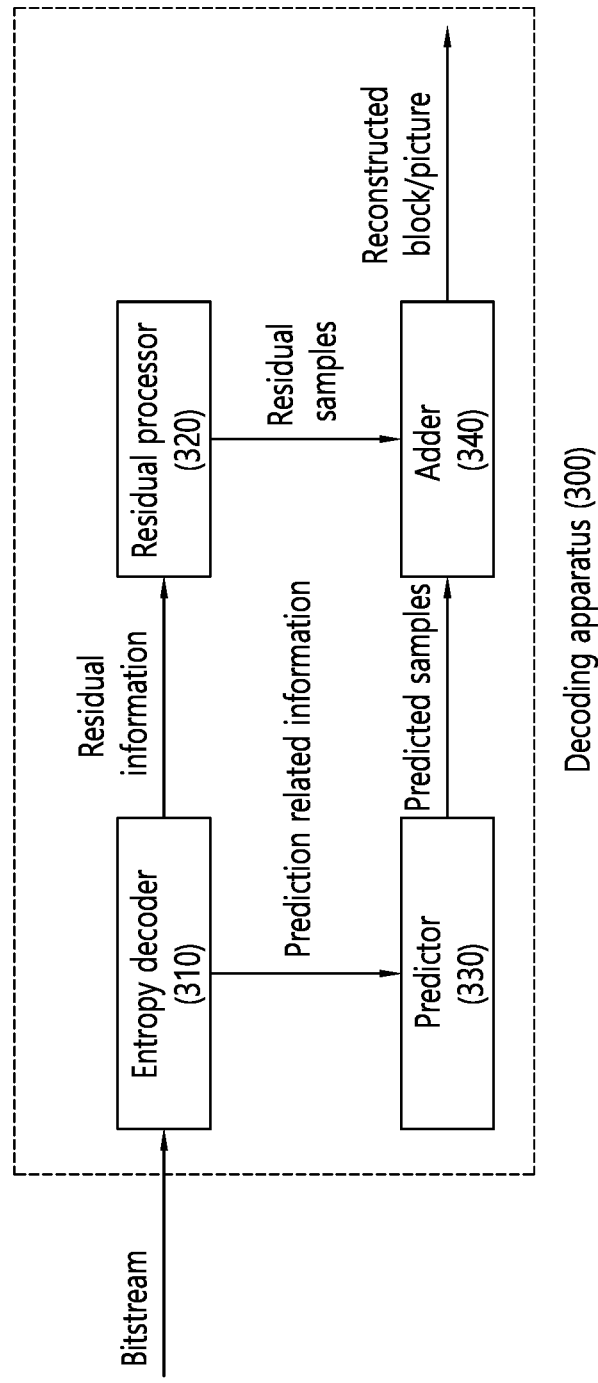

FIGS. 14 and 15 schematically represent an example of a video/image decoding method and associated components according to the embodiment(s) of this document.

The method disclosed in FIG. 14 may be performed by the decoding apparatus 300 disclosed in FIG. 3 or 15. Here, the decoding apparatus 300 disclosed in FIG. 15 is a simplified representation of the decoding apparatus 300 disclosed in FIG. 3. Specifically, step S1400 of FIG. 14 may be performed by the entropy decoder 310 disclosed in FIG. 3; step S1410 of FIG. 14 may be performed by the residual processor 320 disclosed in FIG. 3; and step S1420 of FIG. 14 may be performed by the predictor 330 and/or the adder 340 disclosed in FIG. 3. In addition, although not shown, the process of receiving prediction information for the current block may be performed by the entropy decoder 310 of the decoding apparatus 300, and the process of deriving the prediction sample of the current block may be performed by the predictor 330 of the decoding apparatus 300. In addition, the method disclosed in FIG. 14 may be performed including the embodiments described above in this document. Accordingly, in FIG. 14, a detailed description of contents corresponding to the repetition of the above-described embodiments will be omitted or simplified.

Referring to FIG. 14, the decoding apparatus may receive image information (or video information) from a bitstream (S1400).

For example, the decoding apparatus may parse the bitstream, and derive information (e.g., video/image information) required for image reconstruction (or picture reconstruction). In this case, the image information may include residual information, and the residual information may include value information, position information, a transform technique, transform kernel, a quantization parameter or the like of the quantized transform coefficients. Also, the image information may include prediction-related information (e.g., prediction mode information). Additionally, the image information may include information on a chroma quantization parameter offset used to derive the chroma quantization parameter. Here, the information on the chroma quantization parameter offset may include index information on the chroma quantization parameter offset list. That is, the image information may include various information required in the decoding process, and may be decoded based on a coding method such as exponential Golomb coding, CAVLC, or CABAC.

In addition, image information according to an embodiment of the present document may include various information according to the embodiment(s) described above, and may include information disclosed in at least one of Tables 1 to 13 described above.

For example, the image information may include a palette coding syntax. The palette coding syntax may include various information for performing palette coding on the current block as described above.

For example, the palette coding syntax may include information on a chroma quantization parameter offset. The information on the chroma quantization parameter offset may be index information (e.g., cu_chroma_qp_offset_idx syntax element) for the chroma quantization parameter offset list described in Tables 7 to 13 above. In this case, index information (e.g., cu_chroma_qp_offset_idx syntax element) for the chroma quantization parameter offset list may be included in the palette coding syntax based on information on the number of entries in the chroma quantization parameter offset list. Information on the number of entries in the chroma quantization parameter offset list may be a chroma_qp_offset_list_len_minus1 syntax element described in Tables 7 to 13 above. For example, a value obtained by adding 1 to the value of the chroma_qp_offset_list_len_minus1 syntax element may be derived as the number of entries in the chroma quantization parameter offset list.

As an example, based on a case in which the value of information on the number of entries in the chroma quantization parameter offset list (e.g., chroma_qp_offset_list_len_minus1) is greater than 0, index information (e.g., cu_chroma_qp_offset_idx) on the chroma quantization parameter offset list may be included in the palette coding syntax.

Alternatively, as an example, based on a case in which the value of information on the number of entries in the chroma quantization parameter offset list (e.g., chroma_qp_offset_list_len_minus1) is 0, index information (e.g., cu_chroma_qp_offset_idx) on the chroma quantization parameter offset list may not be included in the palette coding syntax. In this case, the value of index information (e.g., cu_chroma_qp_offset_idx) for the chroma quantization parameter offset list that is not included in the palette coding syntax may be inferred to be 0.

Additionally, for example, the palette coding syntax may include flag information on whether the chroma quantization parameter offset list is used to derive a value of the chroma quantization parameter offset. The flag information may be a cu_chroma_qp_offset_flag syntax element described in Tables 7 to 13 above. As an example, based on a case where the value of the flag information (e.g., cu_chroma_qp_offset_flag) is 1 and the value of information on the number of entries in the chroma quantization parameter offset list (e.g., chroma_qp_offset_list_len_minus1) is greater than 0, index information (e.g., cu_chroma_qp_offset_idx) on the chroma quantization parameter offset list may be included in the palette coding syntax.

Also, for example, the image information may include first enabled flag information on whether the flag information (e.g., cu_chroma_qp_offset_flag) exists in the palette coding syntax. The first enabled flag information may be a cu_chroma_qp_offset_enabled_flag syntax element described in Tables 5 to 6, and may be included in a slice header of image information. For example, based on the value of the first enabled flag information (e.g., cu_chroma_qp_offset_enabled_flag) being 1, the flag information (e.g., cu_chroma_qp_offset_flag) may be included in the palette coding syntax.

Also, for example, the image information may include second enabled flag information on whether the flag information (e.g., cu_chroma_qp_offset_flag) exists in the palette coding syntax. The second enabled flag information may be a pps_cu_chroma_qp_offset_list_enabled_flag syntax element described in Tables 3 and 4, and may be included in a picture parameter set (PPS) of image information. In an example, based on the value of the second enabled flag information (e.g., pps_cu_chroma_qp_offset_list_enabled_flag) being 1, the first enabled flag information (e.g., cu_chroma_qp_offset_enabled_flag) may be included in the slice header.

The decoding apparatus may derive a chroma quantization parameter for a current block based on the information on the chroma quantization parameter offset (S1410).

As an embodiment, the decoding apparatus may obtain information on the chroma quantization parameter offset included in the image information, based on which it may derive the chroma quantization parameter. The information on the chroma quantization parameter offset may include index information on the chroma quantization parameter offset list as described above. In this case, the decoding apparatus may derive a value of the chroma quantization parameter offset from the chroma quantization parameter offset list based on index information on the chroma quantization parameter offset list. And, the decoding apparatus may derive the chroma quantization parameter based on the value of the chroma quantization parameter offset.

In other words, the chroma quantization parameter may be derived based on the value of the chroma quantization parameter offset. The value of the chroma quantization parameter offset may be derived based on the chroma quantization parameter offset list. For example, as described in Tables 10 to 13 above, the value of the chroma quantization parameter offset (e.g., CuQpOffsetCb, CuQpOffsetCr, CuQpOffsetCbCr) may be derived from a chroma quantization parameter offset list (e.g., cb_qp_offset_list, cr_qp_offset_list, joint_cbcr_qp_offset_list) based on index information (e.g., cu_chroma_qp_offset_idx) on the chroma quantization parameter offset list. That is, the offset value indicated by the index information (e.g., cu_chroma_qp_offset_idx) from among the offset values (entries) in the chroma quantization parameter offset list may be derived as the chroma quantization parameter offset value.

The decoding apparatus may generate a reconstructed sample by performing palette coding on the current block based on the chroma quantization parameter (S1420).

As an embodiment, palette coding may be applied to the current block. In this case, for the current block in the palette mode on which palette coding is performed, the decoding apparatus may derive an escape value for the quantized escape value in the current block based on the chroma quantization parameter. In addition, the decoding apparatus may generate a reconstructed sample based on the escape value.

For example, based on the value of the chroma quantization parameter offset (e.g., CuQpOffsetCb, CuQpOffsetCr, CuQpOffsetCbCr), the decoding apparatus may derive a chroma quantization parameter (e.g., Qp'Cb, Qp'Cr, Qp'CbCr), based on which it may derive a quantization parameter Qp used in the palette mode. In this case, the quantization parameter Qp used in the palette mode may be used to derive an escape value for an escape-coded sample in the current block. That is, based on the quantization parameter QP in the palette mode derived from the chroma quantization parameter (e.g., Qp'Cb, Qp'Cr, Qp'CbCr), the decoding apparatus may derive an escape value for an escape-coded sample in the current block from the quantized escape value (e.g., palette_escape_val). Reconstructed samples of the current block may be generated based on the escape value. The quantized escape value (e.g., palette_escape_val) may be information signaled in the palette coding syntax as disclosed in Tables 1 and 2 above. The detailed description of the palette coding has been provided through Tables 1 to 2 above.

According to an embodiment, when the palette mode is not applied to the current block, the chroma quantization parameter for the current block may be derived based on information on the chroma quantization parameter offset signaled through the transform unit syntax as disclosed in Tables 12 and 13 above. In this case, for example, based on index information (e.g., cu_chroma_qp_offset_idx) on the chroma quantization parameter offset list, the value of the chroma quantization parameter offset (e.g., CuQpOffsetCb, CuQpOffsetCr, CuQpOffsetCbCr) may be derived from the chroma quantization parameter offset list (e.g., cb_qp_offset_list, cr_qp_offset_list, joint_cbcr_qp_offset_list). And, based on the value of the chroma quantization parameter offset (e.g., CuQpOffsetCb, CuQpOffsetCr, CuQpOffsetCbCr), the chroma quantization parameter (e.g., Qp'Cb, Qp'Cr, Qp'CbCr) may be derived. That is, the decoding apparatus may perform the scaling process (dequantization process) based on the derived chroma quantization parameter. For example, the decoding apparatus may derive transform coefficients by applying the dequantization process to the quantized transform coefficients for the current block based on the chroma quantization parameter. In addition, the decoding apparatus may derive residual samples based on the transform coefficients, and may generate reconstructed samples based on the residual samples.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present disclosure may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

Further, the decoding apparatus and the encoding apparatus to which the present document is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an internet streaming service providing device, a three-dimensional (3D) video device, a virtual reality (VR) device, an augmented reality (AR: argumente reality) device, a video telephony video device, a transportation means terminal (e.g., a vehicle (including an autonomous vehicle) terminal, an aircraft terminal, a ship terminal, etc.) and a medical video device, and may be used to process a video signal or a data signal. For example, the over the top (OTT) video device may include a game console, a Blu-ray player, an Internet access TV, a home theater system, a smart phone, a tablet PC, a digital video recorder (DVR) and the like.

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 16:
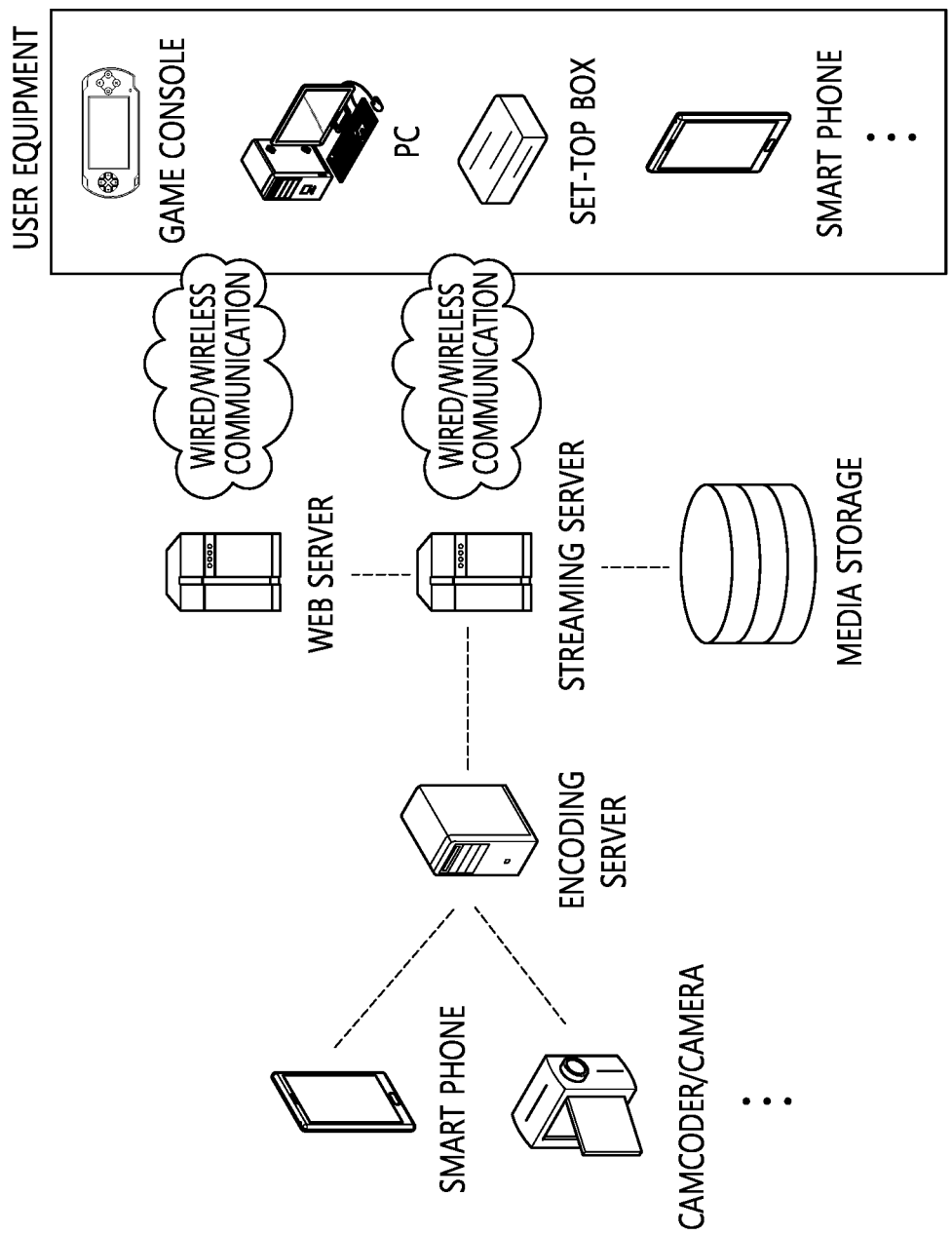
FIG. 16 illustrates an example of a content streaming system to which embodiments disclosed in the present document are applicable.

FIG. 16 represents an example of a contents streaming system to which the embodiment of the present document may be applied.

Referring to FIG. 16, the content streaming system to which the embodiments of the present document is applied may generally include an encoding server, a streaming The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present document can be combined in a various way. For example, technical features in method claims of the present document can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A decoding apparatus for image decoding, the decoding apparatus comprising:
a memory; and
at least one processor connected to the memory, the at least one processor configured to:
obtain image information including information on a chroma quantization parameter offset from a bitstream;
derive a chroma quantization parameter for a current block based on the information on the chroma quantization parameter offset; and
generate a reconstructed sample by performing palette coding on the current block based on the chroma quantization parameter,
wherein the information on the chroma quantization parameter offset includes index information on a chroma quantization parameter offset list,
wherein the image information includes palette coding syntax, and wherein the palette coding syntax includes the information on the chroma quantization parameter offset based on information on the number of entries in the chroma quantization parameter offset list and flag information on whether the chroma quantization parameter offset list is used to derive a value of the chroma quantization parameter offset.

2. An encoding apparatus for image encoding, the encoding apparatus comprising:
    a memory; and
    at least one processor connected to the memory, the at least one processor configured to:
    derive a chroma quantization parameter offset for a current block;
    generate information on the chroma quantization parameter offset; and
    encode image information including the information on the chroma quantization parameter offset,
    wherein the information on the chroma quantization parameter offset includes index information on a chroma quantization parameter offset list,
    wherein the image information includes palette coding syntax, and
    wherein the palette coding syntax includes the information on the chroma quantization parameter offset based on information on a number of entries in the chroma quantization parameter offset list and flag information on whether the chroma quantization parameter offset list is used to derive a value of the chroma quantization parameter offset.

3. An apparatus for transmitting data for an image, the apparatus comprising:
    at least one processor configured to obtain a bitstream of the image, wherein the bitstream is generated based on deriving a chroma quantization parameter offset for a current block, generating information on the chroma quantization parameter offset, and encoding image information including the information on the chroma quantization parameter offset; and
    a transmitter configured to transmit the data comprising the bitstream,
    wherein the information on the chroma quantization parameter offset includes index information on a chroma quantization parameter offset list,
    wherein the image information includes palette coding syntax, and
    wherein the palette coding syntax includes the information on the chroma quantization parameter offset based on information on a number of entries in the chroma quantization parameter offset list and flag information on whether the chroma quantization parameter offset list is used to derive a value of the chroma quantization parameter offset.

* * * * *